(12) United States Patent
Choi et al.

(10) Patent No.: US 11,800,485 B2
(45) Date of Patent: Oct. 24, 2023

(54) SIDELINK POSITIONING FOR DISTRIBUTED ANTENNA SYSTEMS

(71) Applicant: QUALCOMM Incorporated, San Diego, CA (US)

(72) Inventors: Chang-Sik Choi, Seoul (KR); Kapil Gulati, Belle Mead, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/330,492

(22) Filed: May 26, 2021

(65) Prior Publication Data

US 2021/0377907 A1 Dec. 2, 2021

Related U.S. Application Data

(60) Provisional application No. 63/031,240, filed on May 28, 2020.

(51) Int. Cl.
*H04W 64/00* (2009.01)
*H04L 43/0864* (2022.01)
(Continued)

(52) U.S. Cl.
CPC ....... *H04W 64/006* (2013.01); *H04L 43/0864* (2013.01); *H04W 40/12* (2013.01); *H04W 76/14* (2018.02)

(58) Field of Classification Search
CPC ....... H04W 64/00; H04W 4/02; H04W 16/28; H04W 4/023; H04W 4/029; H04W 4/80;
(Continued)

(56) References Cited

U.S. PATENT DOCUMENTS

2016/0011673 A1* 1/2016 Moshfeghi ............ H04W 64/00
455/456.1
2018/0188349 A1 7/2018 Lee et al.
(Continued)

FOREIGN PATENT DOCUMENTS

EP 3591430 A1 1/2020
NO 2019164370 A1 8/2019
WO 2019133495 A1 7/2019

OTHER PUBLICATIONS

International Search Report and Written Opinion—PCT/US2021/034410—ISA/EPO—dated Nov. 10, 2021.
(Continued)

*Primary Examiner* — Kwasi Karikari
(74) *Attorney, Agent, or Firm* — Thien T. Nguyen

(57) ABSTRACT

Techniques are provided for sidelink positioning with a single anchor using distributed antenna systems. An example method for determining relative locations of two stations includes determining a first round trip time for positioning reference signals transmitted between a first station and a first antenna of a second station, determining a second round trip time for the positioning reference signals transmitted between the first station and a second antenna of the second station, wherein the first antenna and the second antenna are disposed in different locations proximate to the second station, and determining relative locations of the first station and the second station based at least in part on the first round trip time and the second round trip time.

25 Claims, 12 Drawing Sheets

(51) Int. Cl.
*H04W 40/12* (2009.01)
*H04W 76/14* (2018.01)

(58) Field of Classification Search
CPC ..... H04W 24/08; H04W 64/003; H04W 4/38;
H04W 4/33; H04W 8/18; H04W 84/12;
H04W 4/40; H04W 4/46
See application file for complete search history.

(56) References Cited

U.S. PATENT DOCUMENTS

2018/0366838 A1* 12/2018 Kim ..................... H01Q 1/3266
2019/0208387 A1* 7/2019 Jiang ..................... H04W 16/14

OTHER PUBLICATIONS

Partial International Search Report—PCT/US2021/034410—ISA/EPO—dated Sep. 17, 2021.

* cited by examiner

SIDELINK POSITIONING FOR DISTRIBUTED ANTENNA SYSTEMS

CROSS-REFERENCE TO RELATED APPLICATION

This application claims the benefit of U.S. Provisional Application No. 63/031,240, filed May 28, 2020, entitled "SIDELINK POSITIONING FOR DISTRIBUTED ANTENNA SYSTEMS," which is assigned to the assignee hereof, and the entire contents of which are hereby incorporated herein by reference for all purposes.

BACKGROUND

Obtaining accurate position information for user equipment, such as cellular telephones or other wireless communication devices, is becoming prevalent in the communications industry. A common means to determine the location of a device is to use a satellite positioning system (SPS), such as the well-known Global Positioning Satellite (GPS) system or Global Navigation Satellite System (GNSS), which employ a number of satellites that are in orbit around the Earth.

Location determination using an SPS is accurate, but sometimes is not available or desired, e.g., in urban canyons or areas with poor satellite signal reception. Other means commonly used to determine the location of a device includes terrestrial based positioning. During terrestrial based positioning, measurements of signals from nearby transmitters, such as base stations may be made and used to determine a position of the user equipment.

SUMMARY

An example method for determining a time of arrival difference with a distributed antenna system according to the disclosure includes receiving a positioning reference signal on a first antenna disposed in a first location, determining a first time of arrival based on the positioning reference signal received on the first antenna, receiving the positioning reference signal on a second antenna disposed in a second location, wherein the first location and the second location are different, determining a second time of arrival based on the positioning reference signal received on the second antenna, and transmitting time information based at least in part on the first time of arrival and the second time of arrival.

Implementations of such a method may include one or more of the following features. The first antenna may be disposed on a forward portion of a vehicle and the second antenna may be disposed in a rear portion of the vehicle. The first antenna may be disposed on a first side of a centerline of the vehicle, and the second antenna may be disposed on a second side of the centerline of the vehicle. The first antenna and the second antenna may be operably coupled to a roadside unit. The positioning reference signal may be transmitted via an unlicensed spectrum. The positioning reference signal may be transmitted via a vehicle-to-everything (V2X) sidelink and an associated sidelink protocol. The V2X sidelink may communicate within an intelligent transportation systems (ITS) frequency spectrum including 5.9 GHz. The time information may be transmitted via sidelink within an intelligent transportation systems (ITS) frequency spectrum including 5.9 GHz. The time information may be a difference in time between the second time of arrival and the first time of arrival. The time information may be a first reference time based on the first time of arrival, and a second reference time based on the second time of arrival, such that the first reference time and the second reference time are based on a network time. The method may include receiving the positioning reference signal on a third antenna disposed in a third location, such that the third location is different from the first location and the second location, determining a third time of arrival based on the positioning reference signal received on the third antenna, and transmitting the time information based at least in part on the third time of arrival.

An example method for determining relative locations of two stations according to the disclosure includes determining a first round trip time for positioning reference signals transmitted between a first station and a first antenna of a second station, determining a second round trip time for the positioning reference signals transmitted between the first station and a second antenna of the second station, wherein the first antenna and the second antenna are disposed in different locations proximate to the second station, and determining relative locations of the first station and the second station based at least in part on the first round trip time and the second round trip time.

Implementations of such a method may include one or more of the following features. The first station may be user equipment in a vehicle and the second station may be a roadside unit with a distributed antenna system. The first station may be a roadside unit and the second station may be a user equipment in a vehicle with a distributed antenna system. The positioning reference signals may be transmitted via an unlicensed spectrum. The positioning reference signals may be transmitted via a vehicle-to-everything (V2X) sidelink and an associated sidelink protocol. The V2X sidelink may communicate within an intelligent transportation systems (ITS) frequency spectrum including 5.9 GHz. An orientation of the second station relative to the first station may be determined. A distance between the first antenna and the second antenna may be in a range of three to nine feet. The method may include receiving assistance data from a network server comprising a location of the first antenna of the second station and a location of the second antenna of the second station, and determining an estimated position of the first station based at least in part on the first round trip time, the location of the first antenna of the second station, the second round trip time, and the location of the second antenna of the second station. Assistance data comprising antenna dimensions associated with the first antenna of the second station and the second antenna of the second station may be received from a network server. The assistance data may be received via an ITS frequency spectrum of a V2X frequency spectrum. The second station may be a vehicle and the antenna dimensions may be associated with a vehicle identification information. The second station may be a vehicle and the antenna dimensions may be associated with a user identification information. The method may include determining a third round trip time for the positioning reference signals transmitted between the first station and a third antenna of the second station, such that the first antenna, the second, and the third antenna are disposed in different locations proximate to the second station, and determining relative locations of the first station and the second station based at least in part on the first round trip time, the second round trip time, and the third round trip time.

An example apparatus for determining a time of arrival difference with a distributed antenna system according to the disclosure includes a memory, at least one transceiver, at least one processor communicatively coupled to the memory and the at least one transceiver and configured to receive a positioning reference signal on a first antenna disposed in a first location, the first antenna being communicatively coupled to the at least one transceiver, determine a first time of arrival based on the positioning reference signal received on the first antenna, receive the positioning reference signal on a second antenna disposed in a second location, the second antenna being communicatively coupled to the at least one transceiver, and wherein the first location and the second location are different, determine a second time of arrival based on the positioning reference signal received on the second antenna, and transmit time information based at least in part on the first time of arrival and the second time of arrival.

Implementations of such an apparatus may include one or more of the following features. The first antenna may be disposed on a forward portion of a vehicle and the second antenna may be disposed in a rear portion of the vehicle. The first antenna may be disposed on a first side of a centerline of the vehicle, and the second antenna may be disposed on a second side of the centerline of the vehicle. The first antenna and the second antenna may be operably coupled to a roadside unit. The positioning reference signal may be transmitted via an unlicensed spectrum. The positioning reference signal may be transmitted via a vehicle-to-everything (V2X) sidelink and an associated sidelink protocol. The V2X sidelink may communicate within an intelligent transportation systems (ITS) frequency spectrum including 5.9 GHz. The time information may be transmitted via sidelink within an intelligent transportation systems (ITS) frequency spectrum including 5.9 GHz. The time information may be a difference in time between the second time of arrival and the first time of arrival. The time information may be a first reference time based on the first time of arrival, and a second reference time based on the second time of arrival, such that the first reference time and the second reference time are based on a network time. The at least one processor may be further configured to receive the positioning reference signal on a third antenna disposed in a third location, the third antenna being communicatively coupled to the at least one transceiver, and wherein the third location is different from the first location and the second location, determine a third time of arrival based on the positioning reference signal received on the third antenna, and transmit the time information based at least in part on the third time of arrival.

An example apparatus for determining relative locations of two stations according to the disclosure includes a memory, at least one transceiver, at least one processor communicatively coupled to the memory and the at least one transceiver, and configured to determine a first round trip time for positioning reference signals transmitted between a first station and a first antenna of a second station, determine a second round trip time for the positioning reference signals transmitted between the first station and a second antenna of the second station, wherein the first antenna and the second antenna are disposed in different locations proximate to the second station, and determine relative locations of the first station and the second station based at least in part on the first round trip time and the second round trip time.

Implementations of such an apparatus may include one or more of the following features. The first station may be user equipment in a vehicle and the second station may be a roadside unit with a distributed antenna system. The first station may be a roadside unit and the second station may be a user equipment in a vehicle with a distributed antenna system. The positioning reference signals may be transmitted via an unlicensed spectrum. The positioning reference signals may be transmitted via a vehicle-to-everything (V2X) sidelink and an associated sidelink protocol. The V2X sidelink may communicate within an intelligent transportation systems (ITS) frequency spectrum including 5.9 GHz. The at least one processor may be further configured to determine an orientation of the second station relative to the first station. A distance between the first antenna and the second antenna may be in a range of three to nine feet. The at least one processor may be further configured to receive assistance data from a network server comprising a location of the first antenna of the second station and a location of the second antenna of the second station, and determine an estimated position of the first station based at least in part on the first round trip time, the location of the first antenna of the second station, the second round trip time, and the location of the second antenna of the second station. The at least one processor may be further configured to receive antenna dimensions associated with the first antenna of the second station and the second antenna of the second station. The assistance data may be received via an ITS frequency spectrum of a V2X frequency spectrum. The second station may be a vehicle and the antenna dimensions may be associated with a vehicle identification information. The second station may be a vehicle and the antenna dimensions may be associated with a user identification information. The at least one processor may be further configured to determine a third round trip time for the positioning reference signals transmitted between the first station and a third antenna of the second station, wherein the first antenna, the second, and the third antenna are disposed in different locations proximate to the second station, and determine relative locations of the first station and the second station based at least in part on the first round trip time, the second round trip time, and the third round trip time.

An example apparatus for determining a time of arrival difference with a distributed antenna system according to the disclosure includes means for receiving a positioning reference signal on a first antenna disposed in a first location, means for determining a first time of arrival based on the positioning reference signal received on the first antenna, means for receiving the positioning reference signal on a second antenna disposed in a second location, wherein the first location and the second location are different, means for determining a second time of arrival based on the positioning reference signal received on the second antenna, and means for transmitting time information based at least in part on the first time of arrival and the second time of arrival.

An example apparatus for determining relative locations of two stations according to the disclosure includes means for determining a first round trip time for positioning reference signals transmitted between a first station and a first antenna of a second station, means for determining a second round trip time for the positioning reference signals transmitted between the first station and a second antenna of the second station, wherein the first antenna and the second antenna are disposed in different locations proximate to the second station, and means for determining relative locations of the first station and the second station based at least in part on the first round trip time and the second round trip time.

An example non-transitory processor-readable storage medium comprising processor-readable instructions configured to cause one or more processors to determine a time of arrival difference with a distributed antenna system according to the disclosure includes code for receiving a positioning reference signal on a first antenna disposed in a first location, code for determining a first time of arrival based on the positioning reference signal received on the first antenna, code for receiving the positioning reference signal on a second antenna disposed in a second location, wherein the first location and the second location are different, code for determining a second time of arrival based on the positioning reference signal received on the second antenna, and code for transmitting time information based at least in part on the first time of arrival and the second time of arrival.

An example non-transitory processor-readable storage medium comprising processor-readable instructions configured to cause one or more processors to determine relative locations of two stations according to the disclosure includes code for determining a first round trip time for positioning reference signals transmitted between a first station and a first antenna of a second station, code for determining a second round trip time for the positioning reference signals transmitted between the first station and a second antenna of the second station, wherein the first antenna and the second antenna are disposed in different locations proximate to the second station, and code for determining relative locations of the first station and the second station based at least in part on the first round trip time and the second round trip time.

Items and/or techniques described herein may provide one or more of the following capabilities, as well as other capabilities not mentioned. A positioning reference signal may be received on one or more antennas of a station with a distributed antenna system. A time of arrival may be determined for more than one of the antennas. The difference in the time of arrivals may be computed. The time of arrival or time difference information may be transmitted to another station. A relative position between two stations may be determined based on the PRS arrival times. A vehicle may be configured with a distributed antenna system. A roadside unit may be configured with a distributed antenna system. Positioning signals may be transmitted via device-to-device sidelink channels. Other capabilities may be provided and not every implementation according to the disclosure must provide any, let alone all, of the capabilities discussed. It may be possible for an effect noted above to be achieved by means other than that noted, and a noted item/technique may not necessarily yield the noted effect.

DETAILED DESCRIPTION

Techniques are discussed herein for sidelink positioning with a single anchor using distributed antenna systems. A vehicle may be configured to communicate with a network including terrestrial stations such as base stations (BSs) and roadside units (RSUs). Signals may be exchanged between a vehicle and an RSU using unlicensed spectrum and other sidelink protocols such as the PC5 protocol supported in vehicle-to-everything (V2X) services. Other communication protocols may be used. In an example, a vehicle may include a distributed antenna system with two or more antenna elements disposed on different locations on the vehicle. A RSU with a single antenna may transmit a positioning reference signal (PRS) to the vehicle via a sidelink and the vehicle may receive the PRS with each antenna. The time of arrival of the PRS for each antenna may be used to determine an orientation of the vehicle. The time of arrival for each antenna may be sent to the RSU via the sidelink to determine a relative location of the vehicle. In an example, a RSU may have a distributed antenna system with two or more antenna elements disposed at different locations proximate to the RSU. A vehicle may send a PRS to the RSU via a sidelink and the RSU may determine a time of arrival for the PRS at each of the antenna elements. The time difference of the PRS arrival times at the antenna elements may be used to determine a relative location of the vehicle. Still other features may be implemented.

Figure 1:
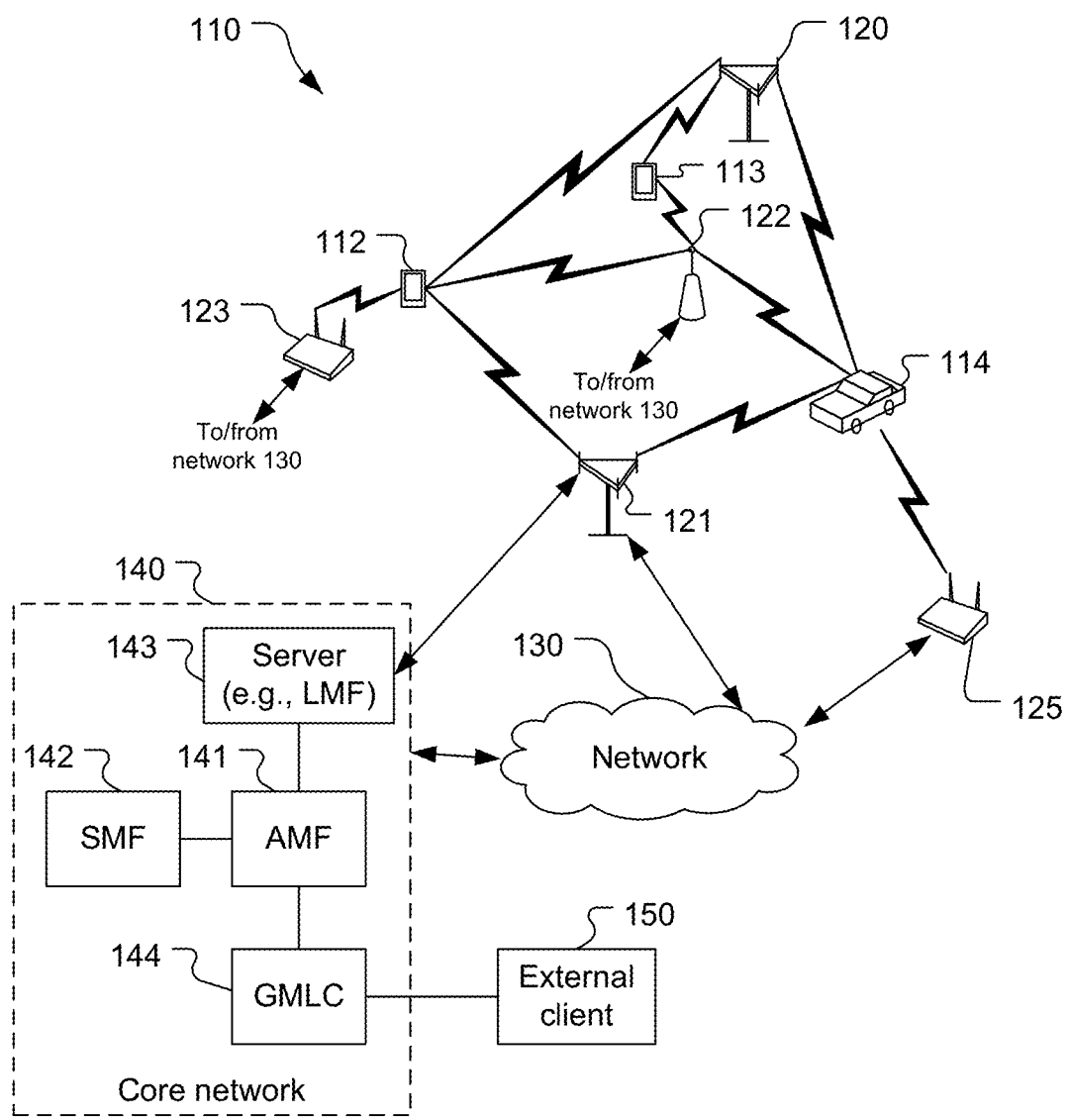
FIG. 1 is a schematic diagram of a connected-vehicle communication system.

Referring to FIG. 1, an example wireless communications system 110 includes a user equipment (UE) 112, a UE 113, a UE 114, base transceiver stations (BTSs) 120, 121, 122, 123, a roadside unit (RSU) 125, a network 130, a core network 140, and an external client 150. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-114 (e.g., using techniques such as Assisted Global Navigation Satellite System (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.).

An LMF may also be referred to as a Location Manager (LM), a Location Function (LF), a commercial LMF (CLMF), or a value-added LMF (VLMF). The server 143 (e.g., an LMF) and/or one or more other devices of the system 110 (e.g., one or more of the UEs 112-114) may be configured to determine locations of the UEs 112-114. The server 143 may communicate directly with the BTS 121 (e.g., a gNB) and/or one or more other BTSs, and may be integrated with the BTS 121 and/or one or more other BTSs.

The SMF 142 may serve as an initial contact point of a Service Control Function (SCF) (not shown) to create, control, and delete media sessions. The server 143 (e.g., an LMF) may be co-located or integrated with a gNB or a TRP (Transmission/Reception Point), or may be disposed remote from the gNB and/or TRP and configured to communicate directly or indirectly with the gNB and/or the TRP.

The AMF 141 may serve as a control node that processes signaling between the UEs 112-114 and the core network 140, and provides QoS (Quality of Service) flow and session management. The AMF 141 may support mobility of the UEs 112-114 including cell change and handover and may participate in supporting signaling connection to the UEs 112-114.

The system 110 is capable of wireless communication in that components of the system 110 can communicate with one another (at least some times using wireless connections) directly or indirectly, e.g., via the BTSs 120-123, the RSU 125, and/or the network 130 (and/or one or more other devices not shown, such as one or more other base transceiver stations). While the BTSs 120-123 are shown separately from the network 130, the network 130 may include one or more of the BTSs 120-123 and may constitute a Radio Access Network (RAN), e.g., a New Radio (NR) RAN which may also be called a Fifth Generation (5G) Next Generation (NG) RAN (NG-RAN). For indirect communications, the communications may be altered during transmission from one entity to another, e.g., to alter header information of data packets, to change format, etc. The UEs 112-114 may communicate with the BTSs 120-122 via Uu interfaces, e.g., in RRC-encapsulated LPP messages (Radio Resource Control encapsulated LTE Positioning Protocol messages) over Uu interfaces. The UEs 112-114 may also communicate with the RSU 125 via PC5 and other sidelink interfaces. The UEs 112-114 shown are a smartphone, a tablet computer, and a vehicle-based device, but these are examples only as the UEs 112-114 are not required to be any of these configurations, and other configurations of UEs may be used. The UEs 112, 113 shown are mobile wireless communication devices (although they may communicate wirelessly and via wired connections) including mobile phones (including smartphones) and a tablet computer. The UE 114 shown is a vehicle-based mobile wireless communication device (although the UE 114 may communicate wirelessly and via wired connections). In an example, the UE 114 may communicate with the RSU 125 via sidelink such as the V2X PC5 interface. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 110 and may communicate with each other and/or with the UEs 112-114, the BTSs 120-123, the network 130, the core network 140, and/or the external client 150. For example, such other devices may include internet of thing (IoT) devices, medical devices, home entertainment, reduced capability UEs (e.g., NR-Light UEs), and/or automation devices, etc. The core network 140 may communicate with the external client 150 (e.g., a computer system), e.g., to allow the external client 150 to request and/or receive location information regarding the UEs 112-114 (e.g., via the GMLC 144).

The UEs 112-114 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure) V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 110 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 120-123 and the RSU 125 may wirelessly communicate with the UEs 112-114 in the system 110 via one or more antennas. A BTS may also be referred to as a base station, an access point, a gNode B (gNB), an access node (AN), a Node B, an evolved Node B (eNB), etc. For example, each of the BTSs 120, 121 may be a gNB or a transmission point gNB, the BTS 122 may be a macro cell (e.g., a high-power cellular base station) and/or a small cell (e.g., a low-power cellular base station), and the BTS 123 may be an access point (e.g., a short-range base station configured to communicate with short-range technology such as WiFi, WiFi-Direct (WiFi-D), Bluetooth®, Bluetooth®-low energy (BLE), Zigbee, etc. One or more of the BTSs 120-123 may be configured to communicate with the UEs 112-114 via multiple carriers. The BTSs 120-123 may be configured as a RSU 125. Each of the BTSs 120, 121 may provide communication coverage for a respective geographic region, e.g. a cell. Each cell may be partitioned into multiple sectors as a function of the base station antennas.

The BTSs 120-123 each comprise one or more Transmission/Reception Points (TRPs). For example, each sector within a cell of a BTS may comprise a TRP, although multiple TRPs may share one or more components (e.g., share a processor but have separate antennas). The system 110 may include only macro TRPs or the system 110 may have TRPs of different types, e.g., macro, pico, and/or femto TRPs, etc. A macro TRP may cover a relatively large geographic area (e.g., several kilometers in radius) and may allow unrestricted access by terminals with service subscriptions. A pico TRP may cover a relatively small geographic area (e.g., a pico cell) and may allow unrestricted access by terminals with service subscriptions. A femto or home TRP may cover a relatively small geographic area (e.g., a femto cell) and may allow restricted access by terminals having association with the femto cell (e.g., terminals for users in a home).

The UEs 112-114 may be referred to as terminals, access terminals (ATs), mobile stations, mobile devices, subscriber units, etc. The UEs 112-114 may include various devices as listed above and/or other devices. The UEs 112-114 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 112-114 utilizing D2D communications may be within a geographic coverage area of a TRP such as one or more of the BTSs 120-123. Other UEs in such a group may be outside such geographic coverage areas, or be otherwise unable to receive transmissions from a base station. Groups of the UEs 112-114 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP. For example, the UE 114 may communicate with RSU 125 via sidelinks in licensed and/or unlicensed spectrum.

Figure 2:
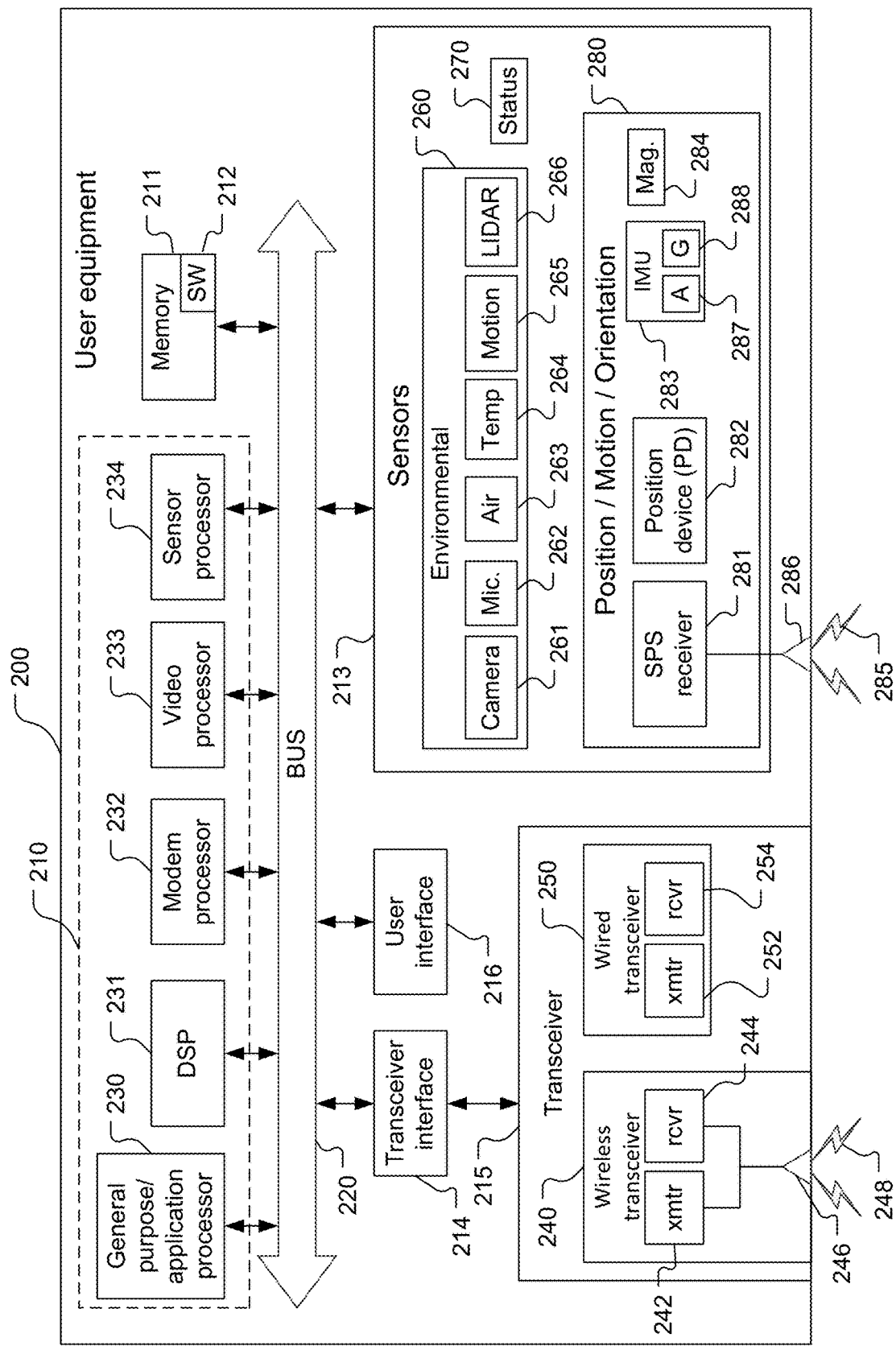
FIG. 2 is a block diagram of components of an example of a user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215, and a user interface 216. The processor 210, the memory 211, the sensor(s) 213, the transceiver interface 214, and the user interface 216 may be communicatively coupled to each other by a bus 220 (which may be configured, e.g., for optical and/or electrical communication). One or more of the components shown (e.g., one or more of the sensors 213, etc.) may be omitted from the UE 200.

The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensors 213, the user interface 216, and/or the wired transceiver 250.

The UE 200 may comprise the modem processor 232 that may be capable of performing baseband processing of signals received and down-converted by the transceiver 215 and/or the SPS receiver 281 (discussed below). The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 includes the sensors 213 that may include one or more of various types of sensors, for example, an environmental sensor 260, a status sensor 270, and a position/motion/orientation (PMO) sensor 280. The PMO sensor 280 may include one or more sensors from which position and/or motion and/or orientation of the UE 200 may be determined. While each of the sensors 260, 270, 280 may be referred to in the singular, each of the sensors 260, 270, 280 may include more than one sensor, examples of some of which are discussed explicitly herein. The sensors 213 may generate analog and/or digital signals indications of which may be stored in the memory 211 and processed by the processor 210 (e.g., the processor 230, the DSP 231, the video processor 233, and/or the sensor processor 234 as appropriate) in support of one or more applications such as, for example, applications directed to positioning, navigation, and/or resource management. The description herein may refer to the processor 210 generally as performing one or more functions that one or more of the processors 230-234 perform.

The sensor(s) 213 may be used in resource management, relative location measurements, relative location determination, motion determination, etc. Information detected by the sensor(s) 213 may be used to determine how to allocate resources of the UE 200, e.g., transmission power, processing power for transmission and/or reception of communication signals, transmission and/or reception directionality, etc. The plural term "resources" if often used throughout the discussion here, but this term includes the singular as well, i.e., a single resource, e.g., being allocated. Also or alternatively, information detected by the sensor(s) may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the server 120 regarding the mobility of the UE 200. For example, based on the information obtained/measured by the sensor(s) 213, the UE 200 may notify/report to the server 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc. The position and/or motion of the UE 200 may be used in determining resource allocation for communication, e.g., between vehicles or between a vehicle and a RSU. The UE 200 may, for example, be disposed in or integrated with a vehicle. For example, the UE 200 may be the UE 114 that is a vehicle, in the example shown in FIG. 1, a car, although other forms of vehicles may be used, e.g., trucks, aerial UEs such as drones, etc. As such, the UE 200 may be configured for various forms of communication, e.g., V2V (vehicle-to-vehicle), V2X (vehicle-to-everything), CV2X (cellular V2X), CV2V (cellular V2V), etc.

The environmental sensor 260 may include one or more sensors for measuring one or more internal and/or external environmental conditions. In this example, the environmental sensor 260 includes a camera 261, a microphone 262, an air-flow sensor 263, a temperature sensor 264, a motion sensor 265, and a LIDAR (Light Detection and Ranging) sensor 266. While each of the sensors 261-266 may be referred to in the singular, each of the sensors 261-266 may include more than one sensor, examples of some of which are discussed explicitly herein. For example, the camera 261 may include at least one camera configured (e.g., designed, made, disposed, and directed) to capture images external to the UE 200 and/or may include one or more cameras configured to capture images internal to the UE 200 (e.g., in a passenger compartment of a vehicle). As other examples, the microphone 262, the temperature sensor 264, and/or the motion sensor 265 may include multiple microphones, multiple thermometers, and/or multiple motion detectors configured to detect sound, temperature, and/or motion (respectively) outside and/or inside of the vehicle. Indeed, any of the sensors 261-265 may include multiple respective sensors outside the vehicle and/or multiple respective sensors inside the vehicle for making respective measurements at multiple locations about the vehicle and/or in different directions relative to the vehicle. The sensors 261-265 are examples and one or more of the sensors 261-265 may be omitted from the UE 200 and/or one or more other sensors may be included in the UE 200. For example, the environmental sensor 260 may include one or more barometric pressure sensors and/or one or more ambient light sensors and/or one or more other sensors.

The camera 261 may be configured for capturing still and/or moving imagery. For example, each camera of the camera 261 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The motion detector 265 is configured to detect motion using known techniques. For example, the motion detector 265 may send and receive sound waves (e.g., ultrasound signals) and analyze the received signals for Doppler effects indicative of motion. Use of multiple motion detectors may help identify the relative location (e.g., direction relative to the UE 200) of an object.

The LIDAR sensor 266 is configured to determine range to an object, which may be used by the processor 210 to detect the presence of an object. Use of multiple LIDAR sensors may help identify the relative location (e.g., direction relative to the UE 200) of an object. The LIDAR sensor 266 may be called a LADAR (laser radar) sensor, as is common when using a LIDAR sensor for detecting relatively small objects such as vehicles or other artificial (human-made) objects.

The status sensor 270 is configured to provide one or more indications of one or more vehicle conditions of the vehicle associated with the UE 200. For example, vehicle conditions may include a gear status of the vehicle (e.g., whether the vehicle is in park, drive, or neutral, or in which gear the vehicle is presently). Another vehicle condition may be whether an emergency brake is engaged. Another vehicle condition may be whether a main brake is presently engaged and possibly engaged to what degree. Another vehicle condition may be whether an accelerator is presently engaged and possibly to what degree. Another vehicle condition may be the status of the steering wheel (e.g., turned which way and how much). Other example vehicle conditions may include whether a right-turn indicator is actuated, whether a left-turn indicator is actuated, and/or whether hazard lights (also called "four ways" or emergency flashers, etc.) are actuated. Another example vehicle condition may include tire status (e.g., tire pressure, rate of tire pressure change (e.g., to indicate a flat or blowout)). Another example vehicle condition is speed as registered by a speedometer of the vehicle. These vehicle conditions are examples, and one or more other sensors may be provided to sense one or more other vehicle conditions.

The PMO sensor 280 may include one or more sensors for providing one or more vehicle conditions. For example, the PMO sensor 280 may include one or more sensors for measuring information from which position and/or motion and/or orientation of the UE 200 may be determined and possibly determining position and/or motion and/or orientation of the UE 200. In this example, the PMO sensor 280 includes a Satellite Positioning System (SPS) receiver 281, a position device (PD) 282, an Inertial Measurement Unit (IMU) 283, and a magnetometer 284. The components of the PMO sensor 280 shown are examples, and one or more of these components may be omitted and/or one or more other components included in the PMO sensor 280. Also, while each of the components 281-284 of the PMO sensor 280 may be referred to in the singular, each of the components 281-284 may include more than one such component, examples of some of which are discussed explicitly herein. Also, the PD 282 may be part of the SPS receiver 281 and/or the IMU 283 and/or part of the processor 210, and may not be a sensor itself (e.g., may not take measurements), but may process information from one or more of the sensors 281, 283, 284 and/or one or more other sensors.

The IMU 283 may comprise one or more inertial sensors, for example, an accelerometer 287 (e.g., responding to acceleration of the UE 200 in three dimensions) and/or a gyroscope 288. While each of the sensors 287, 288 may be referred to in the singular, each of the sensors 287, 288 may include more than one sensor. The IMU 283 may be configured to provide measurements about a direction of motion and/or a speed of motion of the UE 200, which may be used, for example, in relative location determination. For example, the accelerometer 287 and/or the gyroscope 288 of the IMU 283 may detect, respectively, a linear acceleration and a speed of rotation of the UE 200. The linear acceleration and speed of rotation measurements of the UE 200 may be integrated over time (e.g., by the IMU 283 and/or the PD 282) to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 281 (and/or by some other means) for a moment in time and measurements from the accelerometer 287 and the gyroscope 288 taken after this moment in time may be used in dead reckoning to determine a present location of the UE 200 based on movement (direction and distance) of the UE 200 relative to the reference location.

The magnetometer 284 may determine magnetic field strengths in different directions which may be used to determine orientation of the UE 200, which may be used, for example, to provide a digital compass for the UE 200. The magnetometer 284 may include a two-dimensional magnetometer configured to detect and provide indications of magnetic field strength in two orthogonal dimensions. Also or alternatively, the magnetometer 284 may include a three-dimensional magnetometer configured to detect and provide indications of magnetic field strength in three orthogonal dimensions. The magnetometer 284 may provide means for sensing a magnetic field and providing indications of the magnetic field, e.g., to the processor 210. The magnetometer 284 may provide measurements to determine orientation (e.g., relative to magnetic north and/or true north) that may be used for any of a variety of purposes, e.g., to support one or more compass applications.

The SPS receiver 281 (e.g., a Global Positioning System (GPS) receiver or other Global Navigation Satellite System (GNSS) receiver) may be capable of receiving and acquiring SPS signals 285 via an SPS antenna 286. The antenna 286 is configured to transduce the wireless signals 285 to wired signals, e.g., electrical or optical signals, and may be integrated with the antenna 246. The SPS receiver 281 may be configured to process, in whole or in part, the acquired SPS signals 285 for estimating a location of the UE 200. For example, the SPS receiver 281 may be configured to determine location of the UE 200 by trilateration using the SPS signals 285. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 281. The memory 211 may store indications (e.g., measurements) of the SPS signals 285 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200. Also or alternatively, some or all of the position determination signal processing may be performed by the PD 282.

The position device (PD) 282 may be configured to determine a position of the UE 200 (including absolute and/or relative position of the UE 200), motion of the UE 200, and/or time. For example, the PD 282 may communicate with, and/or include some or all of, the SPS receiver 281. The PD 282 may use measurements from the SPS receiver 281 and/or the IMU 283 and/or the magnetometer 284 to determine position and/or motion of the UE 200, e.g., using trilateration or dead reckoning. The PD 282 may work in conjunction with the processor 210 and the memory 211 as appropriate to perform at least a portion of one or more positioning methods (to determine location of the UE 200), although the description herein may refer only to the PD 282 being configured to perform, or performing, in accordance with the positioning method(s). The PD 282 may also or alternatively be configured to determine location of the UE 200 using terrestrial-based signals (e.g., at least some of signals 248 discussed below) for trilateration, for assistance with obtaining and using the SPS signals 285, or both. The PD 282 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 282 may be configured to provide indications of uncertainty and/or error in the determined position and/or motion.

The transceiver 215 may include a wireless transceiver 240 and/or a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels) and/or receiving (e.g., on one or more downlink channels) wireless signals 248 and transducing signals from the wireless signals 248 to wired (e.g., electrical and/or optical) signals and from wired signals to the wireless signals 248. The wireless transceiver 240 may be configured for wireless communication to send communications to, and receive communications from, a variety of entities such as other UEs, base stations, etc. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 130, to send communications to, and receive communications from, a gNB, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

Figure 3:
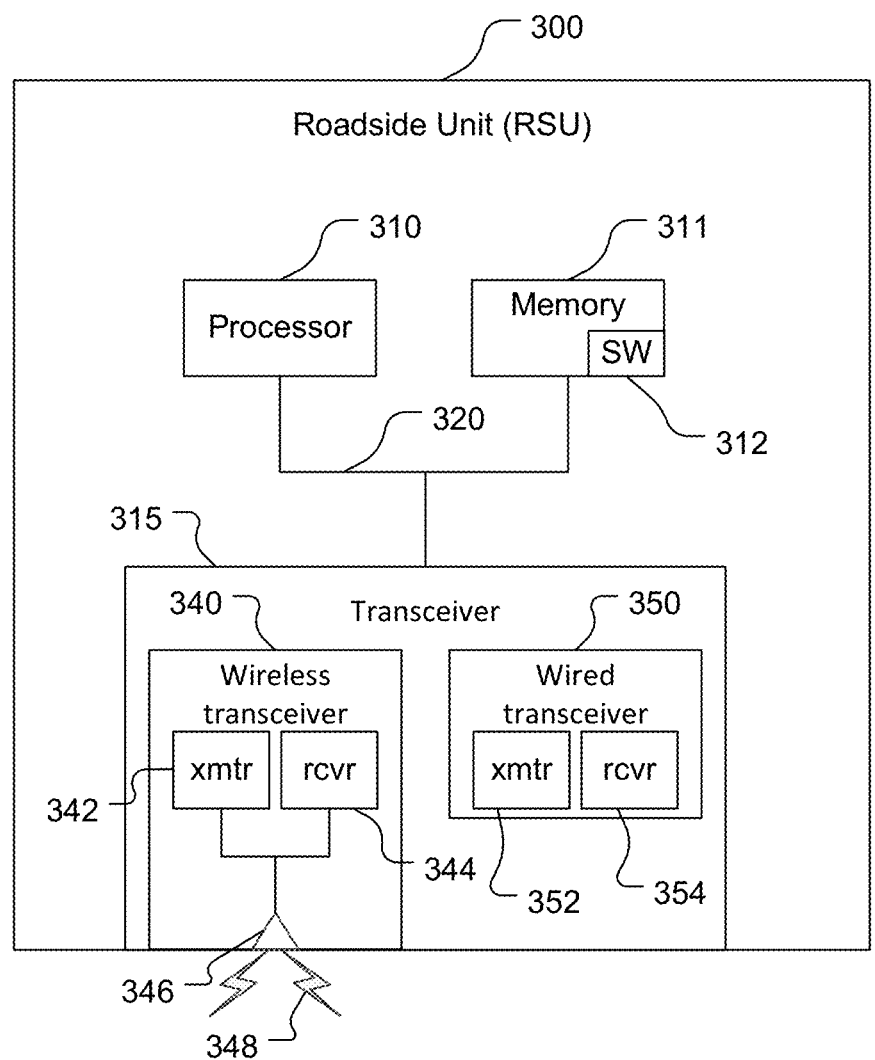
FIG. 3 is a block diagram of components of an example roadside unit.

Referring also to FIG. 3, an example of a RSU 300, such as the RSU 125 in FIG. 1, comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wired interface) may be omitted from the RSU 300. The processor 310 may include one or more intelligent hardware devices, e.g., a central processing unit (CPU), a microcontroller, an application specific integrated circuit (ASIC), etc. The processor 310 may comprise multiple processors The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the RSU 300 performing a function as shorthand for one or more appropriate components of the RSU 300 (and thus of one of the BTSs 120-123) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink or sidelink channels) and/or receiving (e.g., on one or more downlink or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 130 to send communications to, and receive communications from, the server 143, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the RSU 300 shown in FIG. 3 is an example and not limiting of the invention, including the claims, and other configurations may be used. For example, the description herein discusses that the RSU 300 is configured to perform or performs several functions, but one or more of these functions may be performed by the server 143 and/or the UE 200 (i.e., the server 143 and/or the UE 200 may be configured to perform one or more of these functions).

Figure 4:
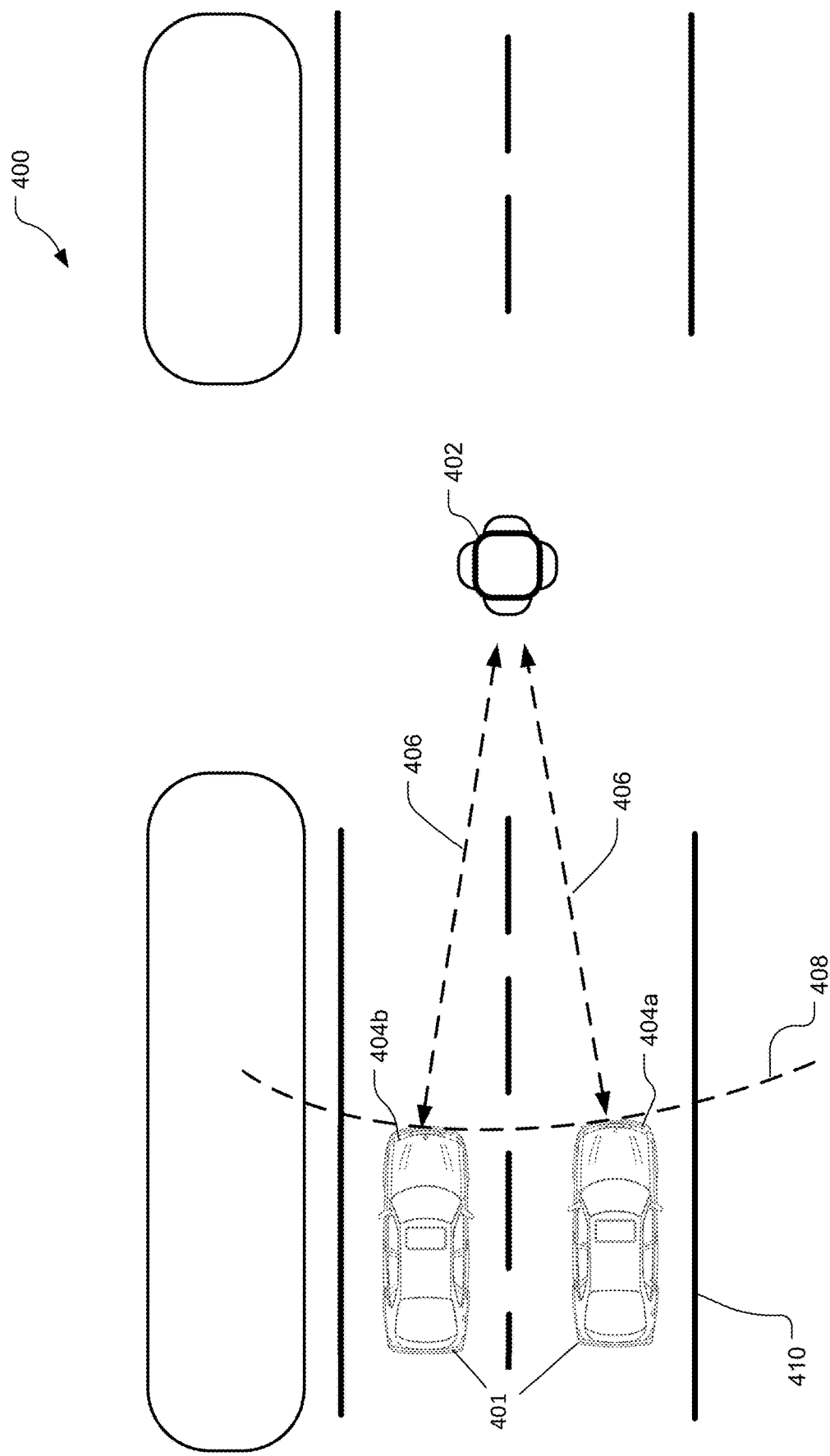
FIG. 4 is a use case diagram of an example of position ambiguity based on a positioning reference signal exchange.

Referring to FIG. 4, with further reference to FIGS. 1-3, a use case diagram 400 of an example of position ambiguity based on a positioning reference signal exchange is shown. The diagram shows an RSU 402 disposed along a road 410. The RSU 402 may be configured in a traffic light, for example, or other roadside fixture such as a lamp post, road sign, etc. The RSU 402 may be described as a single anchor point and may include a single antenna element configured to send and receive signals. For example, the RSU 402 may exchange a positioning reference signal (PRS) 406 with a vehicle 404. In this use case, the vehicle 404 is approaching the RSU 402 and is configured with a single antenna element to send and receive signals such as the PRS 406. The RSU 402 and/or the vehicle 404 are configured to determine a range 408 between the vehicle 404 and the RSU 402 based on a round trip time (RTT), for example, associated with the PRS 406 and a response from the vehicle 404. Since the RTT process provides only a range to the vehicle 401, the vehicle may be located at any point along the range 408. Geographic constraints, such as map data, may be used to limit the expected locations of the vehicle but these constraints may still allow for multiple estimated positions. For example, the vehicle 401 could be located on the right side of the road 410 in a right lane position 404a, or the vehicle 401 could be located on the left side of the road 410 in a left lane position 404b based on the PRS 406. This position ambiguity could continue as the vehicle proceeds along the road 410 up to and past the RSU 402. While RTT is discussed, this ambiguity issue may exist for other ranging techniques such as Time of Arrival (ToA) and Received Signal Strength (e.g., RSS, RSSI) technologies. The sidelink positioning for distributed antenna systems described herein may be used to resolve this type of position ambiguity.

Figure 5B:
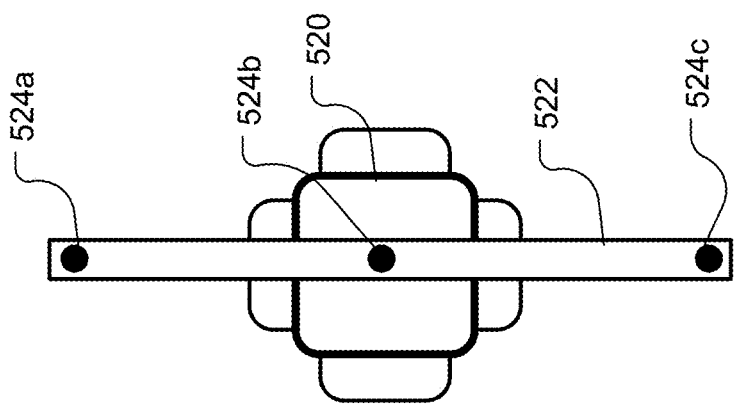
FIG. 5B is an example roadside unit with a distributed antenna system.
Figure 5A:
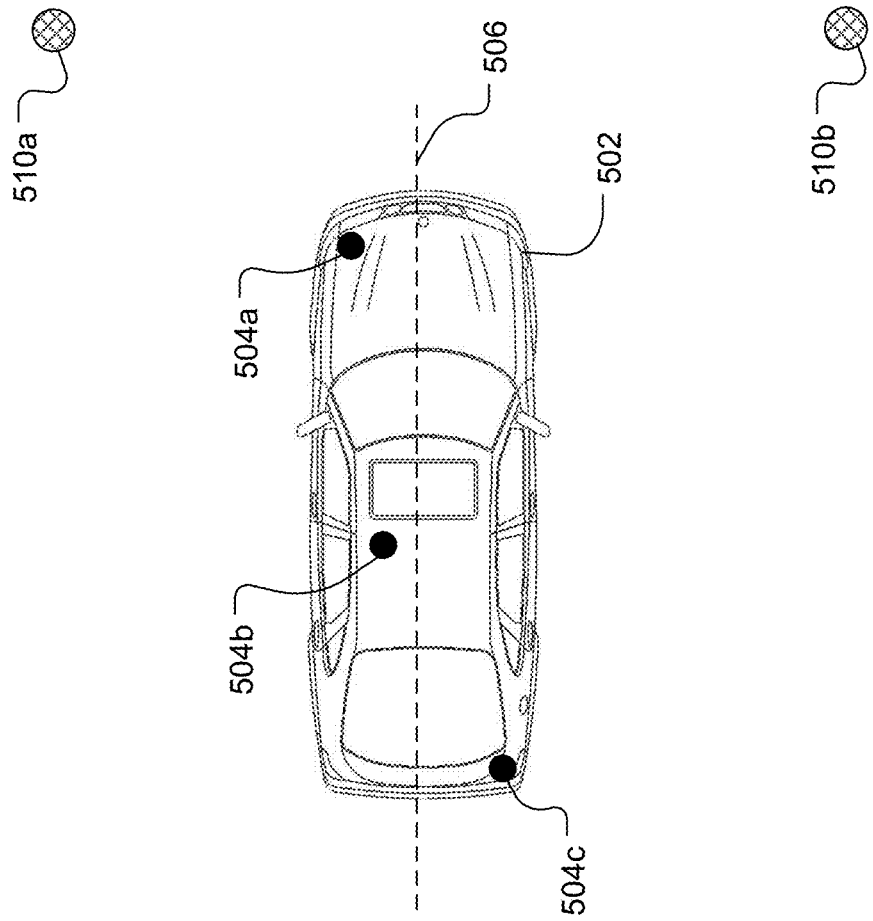
FIG. 5A is an example vehicle with a distributed antenna system.

Referring to FIG. 5A, an example vehicle 502 with a distributed antenna system is shown. The vehicle 502 includes a first antenna 504a, a second antenna 504b and a third antenna 504c. The number and locations of the antennas 504a-c are examples only and not a limitation as other numbers and locations of the antennas may be used. For example, the techniques described herein may apply to a vehicle with two antennas. The vehicle 502 is an example of the UE 200 and the antennas 504a-c may be the antennas 246 in the transceiver 215. In general, the vehicle 502 is configured to move along a longitudinal axis extending from the front of the vehicle to the back of the vehicle. A centerline 506 may extend along the longitudinal access along the designed direction of travel. The antennas 504a-c may be disposed at different distances from the centerline 506 to create spatial variance between the antennas 504a and a remote transceiver. For example, a first antenna 504a may be on a first side of the centerline 506 (e.g., the left side) and a second antenna (e.g., the antenna 504c) may be on a second side of the centerline 506 (e.g., the right side). In an embodiment, the spatial variance of the antennas 504a-c as viewed from a first perspective point 510a is different than when viewed from a second perspective point 510b. That is, the range between the first perspective point 510a and the first antenna 504a and the range between the first antenna 504a and the second perspective point 510b are different. Similar differences exist for the second and third antenna elements 504b-c when viewed from the perspective points 510a-b. The arrangement of the antennas 504a-c on the vehicle 502 is an example only, other configurations may be used to vary the spatial orientation when perceived from different perspective points. In an embodiment, the locations of the antennas 504a-c on the vehicle 502 may conform to an industry standard such that pre-established dimensions (e.g., distances, bearings) between each of the antennas 504a-c. The pre-established dimensions may be associated with vehicle identification information (e.g., manufacturer, type, class, model numbers, etc.) and/or user information (e.g., user ID, vehicle ID, device ID). A calibration procedure may be used to determine the dimensions of the antennas 504a-c. For example, a set of fixed transceivers around the vehicle 504 may be used to measure the relative distances to each of the antennas 504a-c when the vehicle is stationary in a known location. Other calibration techniques may also be used. A network server, such as the LMF 143 or the external client 150, may include a data structure comprising antenna configuration information to associate the antenna configuration on a particular vehicle with vehicle identification and/or user identification information. In operation, and RSU may obtain the vehicle or user information and determine a corresponding antenna configuration. The vehicle 504 may be configured to provide the antenna dimensions directly to an RSU via wireless messaging.

Referring to FIG. 5B, an example RSU 520 with a distributed antenna system is shown. The RSU 520 includes a first antenna 524a, a second antenna 524b and a third antenna 524c. The number an locations of the antennas 524a-c are examples only and not a limitation as other numbers and locations of antennas may be used. The placement of the antennas may be used to create spatial variance with proximate vehicles. For example, the RSU 520 may be a traffic light disposed above a road such as RSU 402 depicted in the use case diagram 400 in FIG. 4. In this use case, the vehicles will approach the RSU 402 from one or more different directions. The antennas 524a-c may be disposed to enable the detection of a vehicle in one or more lanes. For example, the antennas 524a-c may be disposed on a mounting arm 522 that is at an angle to the road 410. In this use case, a vehicle in the right lane position 404a will be closer to the third antenna 524c and a vehicle in the left lane position 404b will be closer to the first antenna 524a. The antennas 524a-c may be in other locations remote from the RSU 520 to create spatial variance with the vehicles. For example, the first antenna 524a may be disposed on one side of the road 410 and the third antenna 524c may be disposed on the other side of the road. The number, locations and coupling configurations of the antennas 524a-c may vary based on the location of the RSU 520 and the configuration of the roadway the RSU 520 serves. The dimensions of the antennas 524a-c (e.g., locations, distances and bearings between each of the antennas 524a-c) may be stored in a data structure and indexed with RSU information (e.g., station ID, RSU location). An approaching vehicle may receive the antenna dimensions from a network server or the RSU 520 and then utilize the dimensions in positioning calculations.

Figure 6:
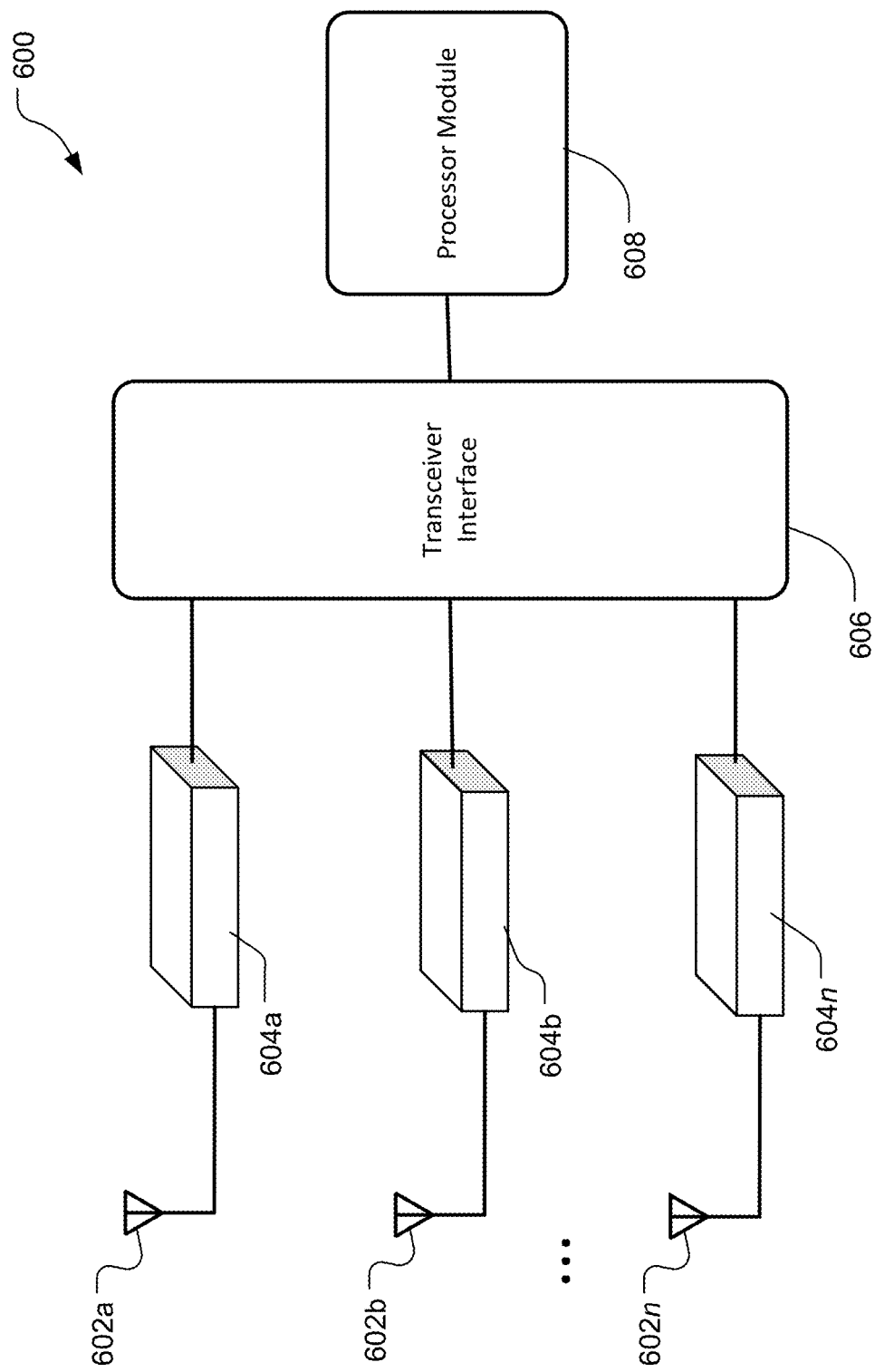
FIG. 6 is an example transceiver system with a distributed antenna system.
Figure 7:
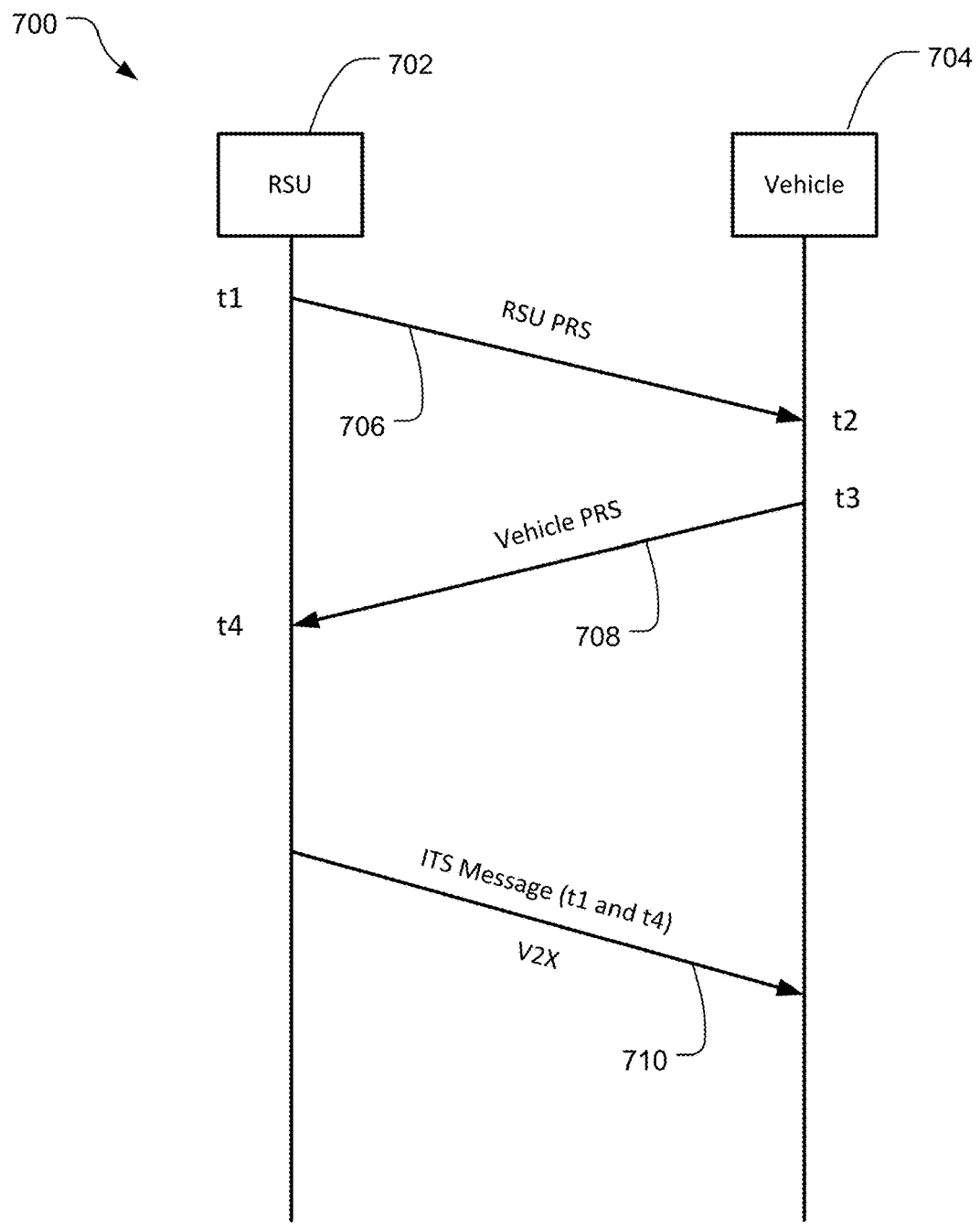
FIG. 7 is an example positioning reference signal exchange between a roadside unit and a vehicle.

Referring to FIG. 6, with further reference to FIGS. 2 and 3, an example transceiver system 600 with a distributed antenna system is shown. The transceiver system 600 may be included in the transceiver 215 of the UE 200, or the transceiver 315 in the RSU 300. In an example, the transceiver system 600 includes a plurality of distributed antennas 602a, 602b . . . 602n respectively coupled to a plurality of transceiver modules 604a, 604b . . . 604n. The antennas 602a, 602b . . . 602n are examples of the antennas 246 in the UE 200 and/or the antennas 346 in the RSU 300. The plurality of transceiver modules 604a, 604b . . . 604n may be coupled to a transceiver interface 606 configured to exchange signals with a processor module 608. The transceiver interface 606 may be included in the plurality of transceiver modules 604a, 604b . . . 604n. The processor module 608 may include a modem processor and/or a general purpose processor (e.g., the processors 230, 310). The transceiver modules 604a, 604b . . . 604n are configured to allow simultaneous, or near simultaneous reception of RF signals with the distributed antennas 602a, 602b . . . 602n. In operation, the distributed antennas 602a, 602b . . . 602n may receive a PRS transmitted by an RSU at different times as the signal reaches each individual antenna. The processor module 608 may capture the arrival times of the PRS at each antenna 602a, 602b . . . 602n and then configure each antenna to send a return PRS message from each of the antennas back to the RSU. Each of the return PRS messages may include the respective time of arrival for that antenna. For example, referring to FIG. 7, an example message flow 700 for a PRS exchange between a RSU 702 and a vehicle 704 is shown. The RSU 702 may transmit a RSU PRS message 706 at time t1 which is received by the vehicle 704 at time t2. The vehicle may transmit a vehicle PRS message 708 at time t3 which is received by the RSU 702 at time t4. The RSU 702 may provide information including the times t1 and t4 to the vehicle 704 in an message, such as an Intelligent Transportation Systems (ITS) message 710 in a V2X implementation. In an example, the message exchanges in FIG. 7 may be performed by each of the distributed antennas 602a, 602b . . . 602n and the associated transceiver modules 604a, 604b . . . 604n individually such that ranges between the RSU 702 and the individual antennas 602a, 602b . . . 602n may be determined. The message flow 700 may be reversed such that the vehicle 704 may transmit a PRS message first (i.e., at time t1) and the RSU 702 may respond.

In a V2X implementation, the RSU 702 may be configured to broadcast the PRS on unlicensed spectrum via a sidelink based on a D2D protocol such as PC5. Other messaging protocols and spectrum may be used. The vehicle 704 may then transmit the PRS message 708 using the same interface. The time of arrival information for the PRS transmissions may be exchanged using ITS messaging in the V2X spectrum. In an example, the vehicle 704 may estimate the range to the RSU 702 based on the time of arrival information (and clock error) using a Kalman filter. The processor module 608 may be a means for estimating the range based on the time of arrival information.

Figure 8:
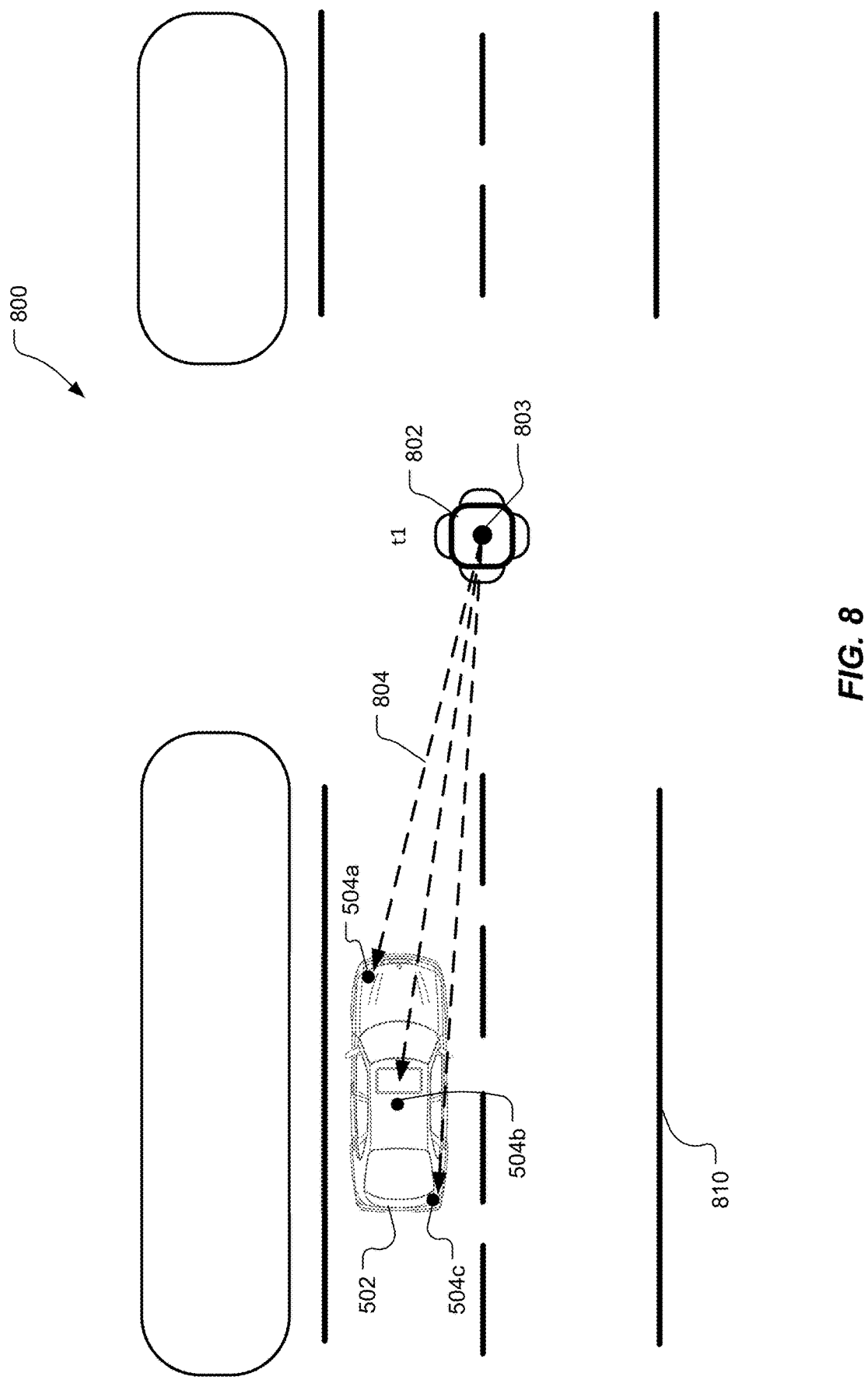
FIG. 8 is a use case diagram of receiving a positioning reference signal with an example distributed antenna system on a vehicle.

Referring to FIG. 8, a use case diagram 800 of receiving a PRS with an example distributed antenna system on the vehicle 502 is shown. The vehicle 502 includes a transceiver system 600 comprising three distributed antennas 504a-c.

The transceiver system 600 may be a UE 200 disposed in, or otherwise integrated with, the vehicle 502. The RSU 802 includes a single antenna 803 (e.g., a single anchor point) and is configured to exchange messages with vehicles on the road 810. In this example, the RSU 802 is disposed on a traffic light but the RSU 802 and the antenna 803 may be located in other areas proximate to the road 810. The RSU 802 broadcasts a PRS 804 which is received by each of the antennas 504a-c. For example, the PRS 804 may be transmitted at time t1, and is detected by a first antenna 504a at a first time $t2_a$, a second antenna 504b at a second time $t2_b$, and at a third antenna 504c at a third time $t2_c$. The processor 602 may be configured to compute the differences in time of arrivals for the PRS 804 at each of the antennas 504a-c. The arrival times t2a-c and/or the difference in the arrival times (e.g., $t2_b-t2_a$, $t2_c-t2_a$, $t2_c-t2_b$) may be transmitted to the RSU 802 via a sidelink. The relative direction of the RSU 802 may be determined based on the differences in the times of arrivals (e.g., via Time Difference of Arrival (TDOA) techniques). In an embodiment, specific spatial dimensions of the antennas 504a-c on the vehicle 502 may be known and used to improve the estimated orientation and/or relative location of the vehicle.

Figure 9:
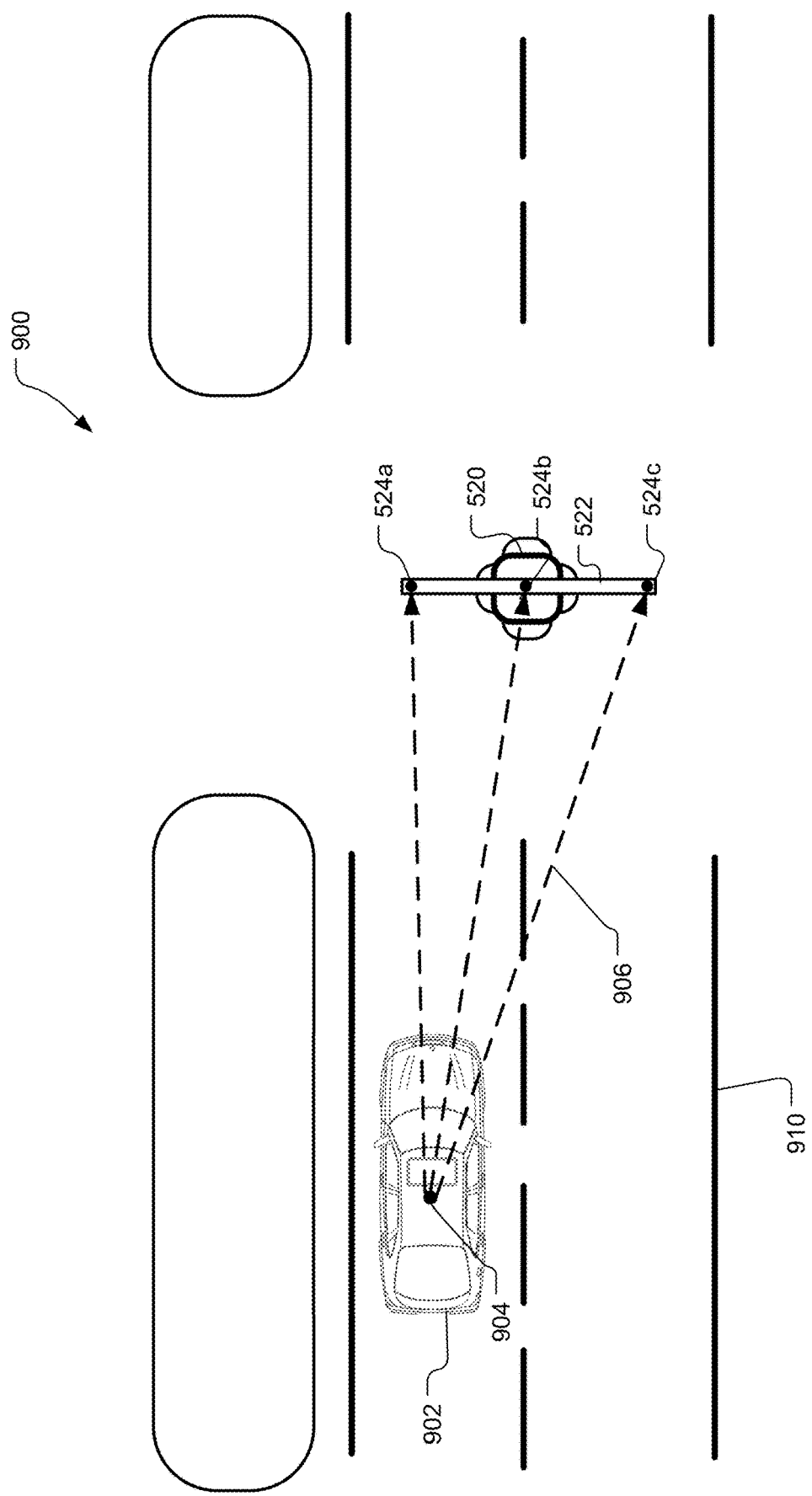
FIG. 9 is a use case diagram of receiving a positioning reference signal with an example distributed antenna system on a roadside unit.

Referring to FIG. 9, a use case diagram 900 of receiving a positioning reference signal with an example distributed antenna system on a roadside unit 520 is shown. The RSU 520 is disposed proximate to a road 910 and includes a transceiver system 600 comprising three distributed antennas 524a-c. The transceiver system 600 may be the transceiver 315 in the RSU 300 described in FIG. 3. An approaching vehicle 902 includes a single antenna 904 and is configured to exchange messages with the RSU 520. In the example use case diagram 900, the RSU 520 is disposed on a traffic light but the RSU 520 and the antennas 524a-c may be located in other areas proximate to the road 910. The vehicle 902 broadcasts a PRS 906 which is received by each of the antennas 524a-c. For example, the PRS 906 may be transmitted at time t1, and is detected by a first antenna 524a at a first time $t2_a$, a second antenna 524b at a second time $t2_b$, and at a third antenna 524c at a third time $t2_c$. The RSU 520 (e.g., the processor 602) may be configured to compute the differences in time of arrivals for the PRS 906 at each of the antennas 524a-c. In an example, the arrival times $t2_{a-c}$ and/or the difference in the arrival times (e.g., $t2_b-t2_a$, $t2_c-t2_a$, $t2_c-t2_b$) may be transmitted from the RSU 520 to the vehicle 902 via a sidelink (e.g. PC5). The relative location of the vehicle 902 may be determined based on the differences in the times of arrivals. In an embodiment, specific spatial dimensions of the antennas 524a-c on the RSU 520 may be known and used to improve the estimated location of the vehicle. In an example, the RSU 520 may be configured to exchange PRS messages with a vehicle with a distributed antenna system (e.g., the vehicle 502 and antennas 504a-c) such that one or more of the distributed antennas 502a-c may be configured to send the PRS 906.

Figure 10:
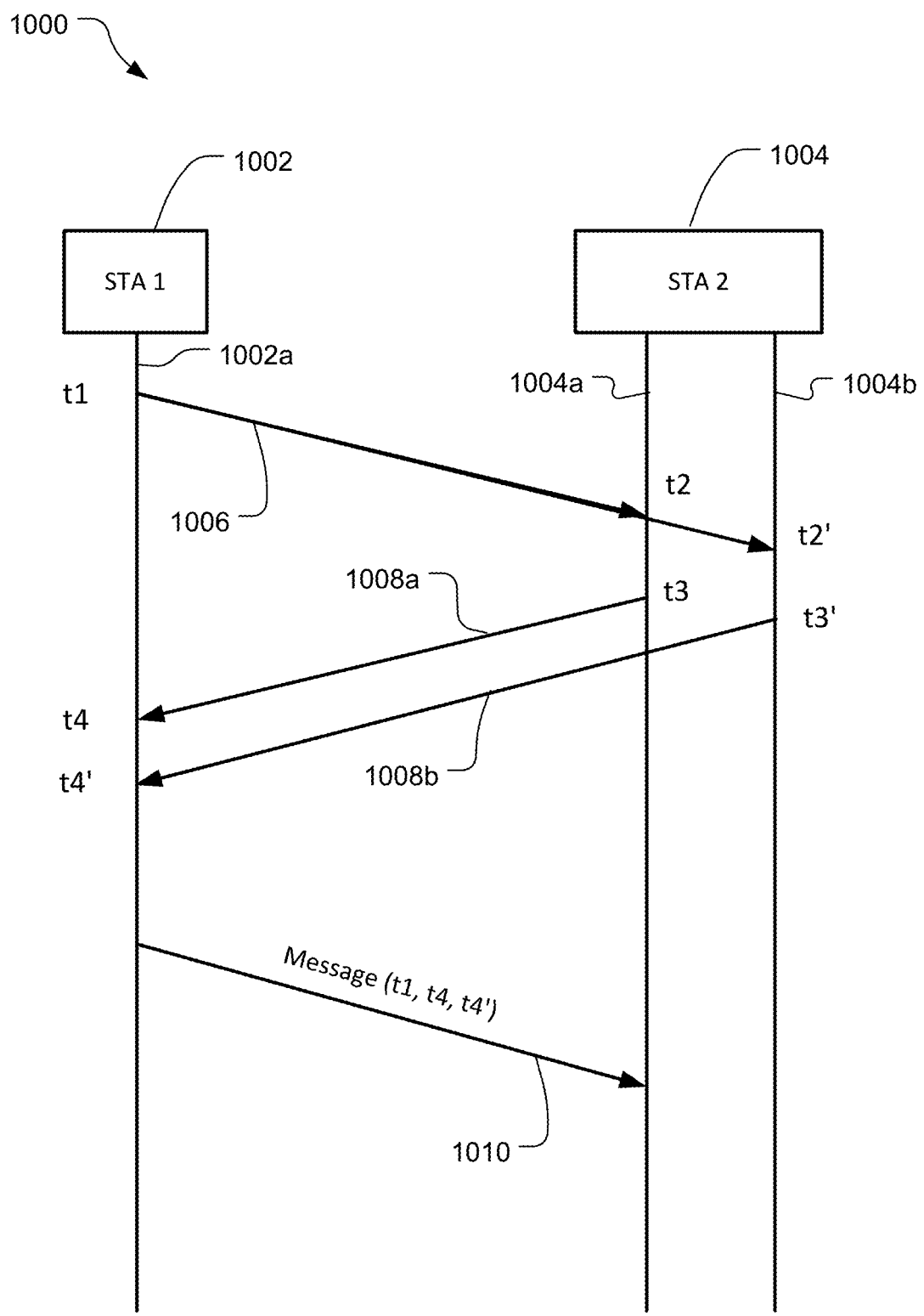
FIG. 10 is an example positioning reference signal exchange including a station with a distributed antenna system.

Referring to FIG. 10, with further reference to FIGS. 8 and 9, an example positioning reference signal exchange 1000 includes a station with a distributed antenna system is shown. A first station 1002 may be an anchor point and includes a single transmit and receive antenna 1002a. In a V2X environment, the first station 1002 may be the RSU 802 or the vehicle 902. The first station 1002 may include multiple antennas, but the signal exchange 1000 is based on utilizing one of the antennas (e.g., an anchor point). The first station 1002 is exchanging PRS messages with a second station 1004. The second station 1004 includes a distributed antenna system with two antennas including a first antenna 1004a and a second antenna 1004b. The two antennas 1004a-b are an example only as additional antennas may be coupled to the second station 1004. The second station 1004 may be the vehicle 502 or the RSU 520 and may include the transceiver system 600 with a transceiver module operably coupled to each of the first and second antennas 1004a-b. At time t1 the first station transmits a first PRS 1006 which is received by the first antenna 1004a on the second station 1004 at time t2. The first PRS 1006 is subsequently received by the second antenna 1004b on the second station 1004 at a time t2' (i.e., t2 prime). In an example, the first PRS 1006 may be transmitted via a sidelink (e.g., PC5) and utilize unlicensed spectrum. The second station 1004 is configured to transmit a first reply PRS 1008a at time t3 with the first antenna 1004a, and a second reply PRS 1008b at time t3' with the second antenna 1004b. The first and second reply PRSs 1008a-b may also utilize the sidelink spectrum and protocol. The first station 1002 receives the first and second reply PRSs 1008a-b at times t4 and t4' respectively. An ITS message 1010 including the values for t1, t4 and t4' may be transmitted and received by the second station 1004. The second station 1004 is configured to utilize the received t1, t4 and t4' times with the t2, t2', t3 and t3' to determine a first round trip time between the first station 1002 and the first antenna 1004a, and a second round trip time between the first station 1002 and the second antenna 1004b. For example, the first round trip time may be computed as:

$$z1 = (t4-t3)+(t2-t1); \qquad (1)$$

and the second round trip time may be computed as:

$$z2 = (t4'-t3')+(t2'-t1). \qquad (2)$$

Additional messages may be used to compute additional round trip times if the stations include more distributed antennas. The resulting round trip times may be used to determine the location of the second station 1004 relative to the first station 1002. In an example, the first and second round trip times may be used to determine an orientation of the second station 1004 based on the position of the antennas 1004a-b on the second station 1004. Other information, such as map data and the geographic coordinates of the first station 1002, may be used to determine an estimated location of the second station based on the round trip times.

Figure 11:
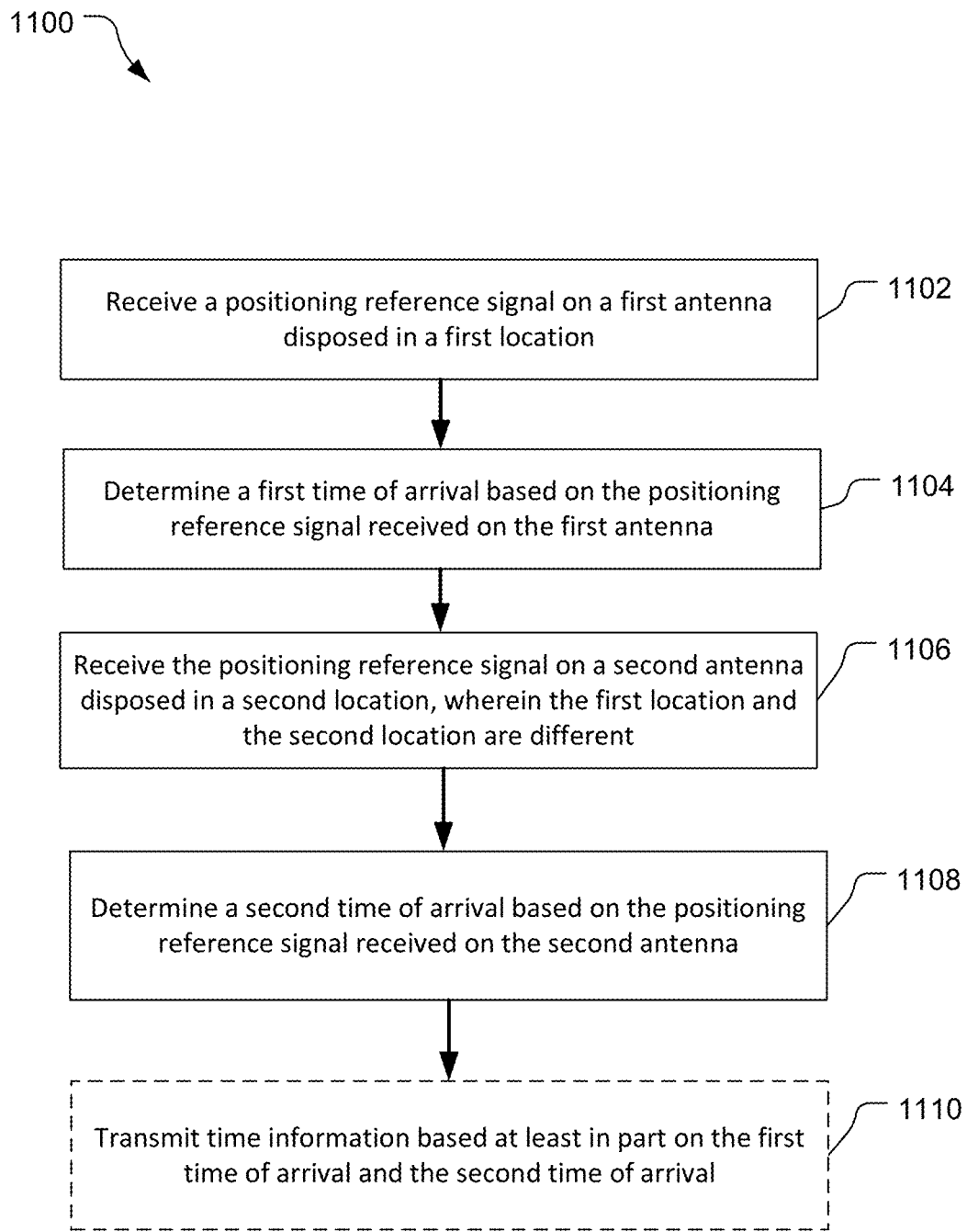
FIG. 11 is a process flow diagram of an example method for determining a time of arrival difference with a distributed antenna system.

Referring to FIG. 11, with further reference to FIGS. 6, 8 and 9, a method 1100 for determining a time of arrival difference with a distributed antenna system includes the stages shown. The method 1100 is, however, an example only and not limiting. The method 1100 may be altered, e.g., by having stages added, removed, rearranged, combined, performed concurrently, and/or having single stages split into multiple stages. For example, transmitting time information at stage 1110 is optional as the time information may be used locally.

At stage 1102, the method includes receiving a positioning reference signal on a first antenna disposed in a first location. The first antenna 504a on the vehicle 502 or the first antenna 524a on the RSU 520 may be means for receiving a PRS. In an example, an RSU 300 may transmit a PRS via a sidelink protocol (e.g., D2D, PC5). The sidelink may utilize the ITS spectrum at approximately 5.9 GHz. The sidelink signals may conform with industry standards such as the 3GPP release 14 physical sidelink shared channel (PSSCH) and the physical sidelink control channel (PSCCH). In general, the PRS may be configurable with respect to bandwidth, time, periodicity, power setting, muting patterns, and other properties to enable reliable time of arrival (TOA) measurements. Referring to FIG. 5, as an example, the PRS 804 transmitted by the RSU 802 is received by the first antenna 504*a* on the vehicle 502.

At stage 1104, the method includes determining a first time of arrival based on the positioning reference signal received on the first antenna. The processor 230 in the UE 200 or the processor 310 in the RSU 300 may be a means for determining the first time of arrival. The processors 230, 310 may include clocking components configured to measure system and/or relative time periods. In an example, the time of arrivals may be based on a network time and/or a time determined by a satellite navigation system (e.g., the SPS receiver 281). Increasing processing speeds enable the measurement of time in the nanosecond range and lower. The time of arrival of the PRS at the first antenna may be stored in local memory (e.g., memory 211, 311) for subsequent processing and/or transmission to a network.

At stage 1106, the method includes receiving the positioning reference signal on a second antenna disposed in a second location, wherein the first location and the second location are different. The third antenna 504*c* on the vehicle 502 or the third antenna 524*c* on the RSU 520 may be a means for receiving the PRS. Referring to FIG. 8, the PRS 804 is receive by the third antenna 504*c*. In an example, the first antenna 504*a* is located in a forward area of the vehicle 502 and the third antenna 504*c* is located in a rear area of the vehicle 502. The locations are examples only. The locations of the first and second antennas may be stored in local memory (e.g., memory 211, 311), or available via a network resource (e.g., the LMF 143, external client 150). For example, the locations of the antennas may be based on vehicle configuration information (e.g., model no., vehicle ID) and/or user identification information.

At stage 1108, the method includes determining a second time of arrival based on the positioning reference signal received on the second antenna. The processor 230 in the UE 200 or the processor 310 in the RSU 300 may be a means for determining the second time of arrival. The clocking components associated with the processors 230, 310 may measure a relative time difference between the first time of arrival and the second time of arrival. In an example, the times of arrival may be based on a reference time system (e.g., network system time, GPS time). The difference in the times of arrival, and/or the reference time of arrival of the PRS at arriving the second antenna may be stored in local memory (e.g., memory 211, 311) for subsequent processing and/or transmission to a network.

At stage 1110, the method optionally includes transmitting time information based at least in part on the first time of arrival and the second time of arrival. The transceiver 215 in the UE 200 or the transceiver 315 in the RSU 300 are means for transmitting the time information. In an example, the time information may be a time difference between the first time of arrival determined at stage 1104 and the second time of arrival determined at stage 1108. The time information may also be the first and second times of arrival based on a reference time system. Referring to FIG. 8, where the first and second antennas 504*a*, 504*c* are disposed on the vehicle 502, the time information may be transmitted to the RSU 802 in an ITS message via a sidelink. In operation, the time information may be used by the RSU 802, or other network resources, to determine a relative location of the vehicle 502. For example, to determine which driving lane of the road 810 the vehicle is currently in. Referring to FIG. 9, where the first and second antennas 524*a*, 524*c* are operably coupled to the RSU 520, the time information based on receiving the PRS 906 may be transmitted to the vehicle 902 in an ITS message via a sidelink. In operation, the vehicle 902 may be configured to utilize the time information to estimate a current location on the road 910. In an example, the vehicle 902 may receive additional assistance data (e.g., the location of the antennas 524*a*, 524*c*, map constraints, etc.) to estimate a location of the vehicle 902. The assistance data may be received via a sidelink with RSU 520 (e.g., PC5), or from a base station via a Uu interface. Other messaging and signaling protocols may be used to transmit the time information between a vehicle and a RSU.

Figure 12:
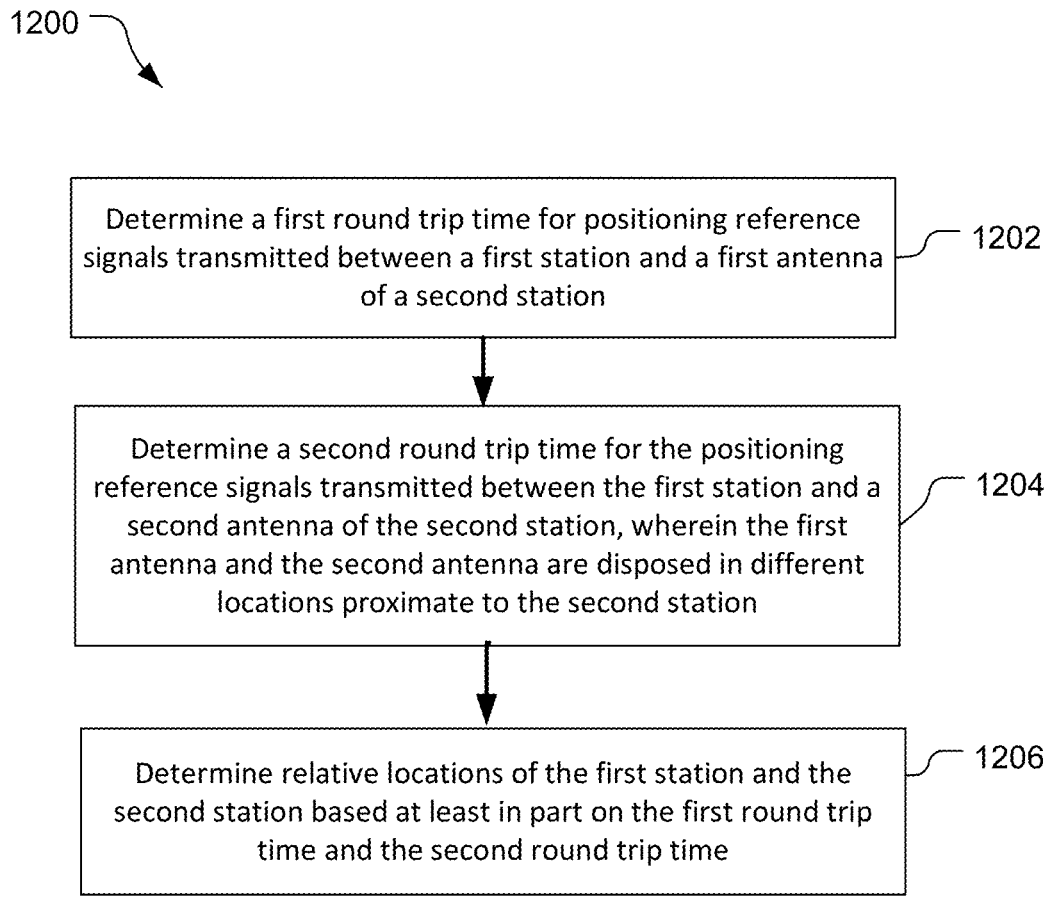
FIG. 12 is a process flow diagram of an example method for determining relative locations of two stations.

Referring to FIG. 12, with further reference to FIG. 10, a method 1200 for determining relative locations of two stations includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method includes determining a first round trip time for positioning reference signals transmitted between a first station and a first antenna of a second station. The UE 200 and the RSU 300 are a means for determining a first round trip time. In an example, the first station 1002, such as the RSU 300, may transmit the first PRS 1006 at time t1 which is received by the first antenna 1004*a* on the second station 1004 at time t2. The second station 1004 may be the UE 200 with a distributed antenna system including at least a first and second antenna. The second station 1004 is configured to transmit a first reply PRS 1008*a* at time t3 with the first antenna 1004*a*. The first reply PRS 1008*a* arrives at the first station 1002 at time t4. The first station 1002 transmits a message, such as the ITS message 1010, including the t1 and t4 values to the second station 1004, and the second station 1004 is configured to compute the first round trip time based on equation 1 above.

At stage 1204, the method includes determining a second round trip time for the positioning reference signals transmitted between the first station and a second antenna of the second station, wherein the first antenna and the second antenna are disposed in different locations proximate to the second station. The UE 200 and the RSU 300 are a means for determining a second round trip time. The PRS 1006 transmitted at time t1 by the first station is also received by the second antenna 1004*b* on the second station 1004 at a time t2'. The second station 1004 is configured to send a second reply PRS 1008*b* at time t3' with the second antenna 1004*b*. The second reply PRS 1008*b* arrives at the first station 1002 at time t4'. The first station 1002 transmits a message, such as the ITS message 1010, including the t1 and t4' values to the second station 1004, and the second station 1004 is configured to determine the second round trip time based on equation 2 above. In an example, a single ITS message 1010 may include the t1, t4 and t4' values. Additional messages may also be used. The first antenna 1004*a* and the second antenna 1004*b* are located in different locations such that they are spaced apart from one another. In an example, the distance between the antennas may be in the range of 3-9 feet from one another. Other separation distances (e.g., 1, 2, 10, 15, 20, etc.) may be used based on a vehicle configuration or the geography of the road proximate to the RSU 300.

At stage 1206, the method includes determining relative locations of the first station and the second station based at least in part on the first round trip time and the second round trip time. The UE 200 and the RSU 300 are a means for determining the relative locations. The distance between the first station 1002 and the respective first and second antennas 1004*a*-*b* of the second station may be generally computed using the formula RTT/2 times the speed of light (i.e., c). Additional correction factors may be used to refine the distance computation. The difference in the first and second round trip times, and the corresponding different distances, may be used to estimate an orientation of the second station 1004 relative to the first station 1002. For example, if the first antenna 1004a is located in a forward part of a vehicle, a shorter round trip time associated with the first antenna 1004a would indicate the front of the vehicle is closer to the first station 1002. Assistance data received from a network resource (e.g., LMF 143, external client 150, RSU 125) may be used to generate a position estimate for the first or second stations 1002, 1004. For example, map data and antenna location information may be used to generate a position estimate based on the round trip times. In an embodiment, the method 1200 may include receiving assistance data indicating the locations of the first and second antennas 1004a-b coupled to the second station 1004 and then determining an estimated position of the first station 1002 based at least in part on the first and second round trip times and the locations of the first and second antennas 1004a-b.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Implementation examples are described in the following numbered clauses:

1. A method for determining a time of arrival difference with a distributed antenna system, comprising:
   receiving a positioning reference signal on a first antenna disposed in a first location;
   determining a first time of arrival based on the positioning reference signal received on the first antenna;
   receiving the positioning reference signal on a second antenna disposed in a second location, wherein the first location and the second location are different;
   determining a second time of arrival based on the positioning reference signal received on the second antenna; and
   transmitting time information based at least in part on the first time of arrival and the second time of arrival.

2. The method of clause 1 wherein the first antenna is disposed on a forward portion of a vehicle and the second antenna is disposed in a rear portion of the vehicle.

3. The method of clause 2 wherein the first antenna is disposed on a first side of a centerline of the vehicle, and the second antenna is disposed on a second side of the centerline of the vehicle.

4. The method of clause 1 wherein the first antenna and the second antenna are operably coupled to a roadside unit.

5. The method of clause 1 wherein the positioning reference signal is transmitted via an unlicensed spectrum.

6. The method of clause 1 wherein the positioning reference signal is transmitted via a vehicle-to-everything (V2X) sidelink and an associated sidelink protocol.

7. The method of clause 6 wherein the V2X sidelink communicates within an intelligent transportation systems (ITS) frequency spectrum including 5.9 GHz.

8. The method of clause 1 wherein the time information is transmitted via sidelink within an intelligent transportation systems (ITS) frequency spectrum including 5.9 GHz.

9. The method of clause 1 wherein the time information is a difference in time between the second time of arrival and the first time of arrival.

10. The method of clause 1 wherein the time information is a first reference time based on the first time of arrival, and a second reference time based on the second time of arrival, wherein the first reference time and the second reference time are based on a network time.

11. The method of clause 1 further comprising:
    receiving the positioning reference signal on a third antenna disposed in a third location, wherein the third location is different from the first location and the second location;
    determining a third time of arrival based on the positioning reference signal received on the third antenna;
    transmitting the time information based at least in part on the third time of arrival.

12. A method for determining relative locations of two stations, comprising:
    determining a first round trip time for positioning reference signals transmitted between a first station and a first antenna of a second station;
    determining a second round trip time for the positioning reference signals transmitted between the first station and a second antenna of the second station, wherein the first antenna and the second antenna are disposed in different locations proximate to the second station; and
    determining relative locations of the first station and the second station based at least in part on the first round trip time and the second round trip time.

13. The method of clause 12 wherein the first station is a user equipment in a vehicle and the second station is a roadside unit with a distributed antenna system.

14. The method of clause 12 wherein the first station is a roadside unit and the second station is a user equipment in a vehicle with a distributed antenna system.

15. The method of clause 12 wherein the positioning reference signals are transmitted via an unlicensed spectrum.

16. The method of clause 12 wherein the positioning reference signals are transmitted via a vehicle-to-everything (V2X) sidelink and an associated sidelink protocol.

17. The method of clause 16 wherein the V2X sidelink communicates within an intelligent transportation systems (ITS) frequency spectrum including 5.9 GHz.

18. The method of clause 12 further comprising determining an orientation of the second station relative to the first station.

19. The method of clause 12 wherein a distance between the first antenna and the second antenna is in a range of three to nine feet.

20. The method of clause 12 further comprising:
    receiving assistance data from a network server comprising a location of the first antenna of the second station and a location of the second antenna of the second station; and
    determining an estimated position of the first station based at least in part on the first round trip time, the location of the first antenna of the second station, the second round trip time, and the location of the second antenna of the second station.

21. The method of clause 12 further comprising receiving assistance data from a network server data comprising antenna dimensions associated with the first antenna of the second station and the second antenna of the second station.

22. The method of clause 21 wherein the assistance data is received via an ITS frequency spectrum of a V2X frequency spectrum.

23. The method of clause 21 wherein the second station is a vehicle and the antenna dimensions are associated with a vehicle identification information.

24. The method of clause 21 wherein the second station is a vehicle and the antenna dimensions are associated with a user identification information.

25. The method of clause 12 further comprising:
determining a third round trip time for the positioning reference signals transmitted between the first station and a third antenna of the second station, wherein the first antenna, the second, and the third antenna are disposed in different locations proximate to the second station; and
determining relative locations of the first station and the second station based at least in part on the first round trip time, the second round trip time, and the third round trip time.

26. An apparatus for determining a time of arrival difference with a distributed antenna system, comprising:
a memory;
at least one transceiver;
at least one processor communicatively coupled to the memory and the at least one transceiver and configured to:
receive a positioning reference signal on a first antenna disposed in a first location, the first antenna being communicatively coupled to the at least one transceiver;
determine a first time of arrival based on the positioning reference signal received on the first antenna;
receive the positioning reference signal on a second antenna disposed in a second location, the second antenna being communicatively coupled to the at least one transceiver, and wherein the first location and the second location are different;
determine a second time of arrival based on the positioning reference signal received on the second antenna; and
transmit time information based at least in part on the first time of arrival and the second time of arrival.

27. The apparatus of clause 26 wherein the first antenna is disposed on a forward portion of a vehicle and the second antenna is disposed in a rear portion of the vehicle.

28. The apparatus of clause 27 wherein the first antenna is disposed on a first side of a centerline of the vehicle, and the second antenna is disposed on a second side of the centerline of the vehicle.

29. The apparatus of clause 26 wherein the first antenna and the second antenna are operably coupled to a roadside unit.

30. The apparatus of clause 26 wherein the positioning reference signal is transmitted via an unlicensed spectrum.

31. The apparatus of clause 26 wherein the positioning reference signal is transmitted via a vehicle-to-everything (V2X) sidelink and an associated sidelink protocol.

32. The apparatus of clause 31 wherein the V2X sidelink communicates within an intelligent transportation systems (ITS) frequency spectrum including 5.9 GHz.

33. The apparatus of clause 26 wherein the time information is transmitted via sidelink within an intelligent transportation systems (ITS) frequency spectrum including 5.9 GHz.

34. The apparatus of clause 26 wherein the time information is a difference in time between the second time of arrival and the first time of arrival.

35. The apparatus of clause 26 wherein the time information is a first reference time based on the first time of arrival, and a second reference time based on the second time of arrival, wherein the first reference time and the second reference time are based on a network time.

36. The apparatus of clause 26 wherein the at least one processor is further configured to:
receive the positioning reference signal on a third antenna disposed in a third location, the third antenna being communicatively coupled to the at least one transceiver, and wherein the third location is different from the first location and the second location;
determine a third time of arrival based on the positioning reference signal received on the third antenna;
transmit the time information based at least in part on the third time of arrival.

37. An apparatus for determining relative locations of two stations, comprising:
a memory;
at least one transceiver;
at least one processor communicatively coupled to the memory and the at least one transceiver, and configured to:
determine a first round trip time for positioning reference signals transmitted between a first station and a first antenna of a second station;
determine a second round trip time for the positioning reference signals transmitted between the first station and a second antenna of the second station, wherein the first antenna and the second antenna are disposed in different locations proximate to the second station; and
determine relative locations of the first station and the second station based at least in part on the first round trip time and the second round trip time.

38. The apparatus of clause 37 wherein the first station is a user equipment in a vehicle and the second station is a roadside unit with a distributed antenna system.

39. The apparatus of clause 37 wherein the first station is a roadside unit and the second station is a user equipment in a vehicle with a distributed antenna system.

40. The apparatus of clause 37 wherein the positioning reference signals are transmitted via an unlicensed spectrum.

41. The apparatus of clause 37 wherein the positioning reference signals are transmitted via a vehicle-to-everything (V2X) sidelink and an associated sidelink protocol.

42. The apparatus of clause 41 wherein the V2X sidelink communicates within an intelligent transportation systems (ITS) frequency spectrum including 5.9 GHz.

43. The apparatus of clause 37 wherein the at least one processor is further configured to determine an orientation of the second station relative to the first station.

44. The apparatus of clause 37 wherein a distance between the first antenna and the second antenna is in a range of three to nine feet.

45. The apparatus of clause 37 wherein the at least one processor is further configured to:
receive assistance data from a network server comprising a location of the first antenna of the second station and a location of the second antenna of the second station; and
determine an estimated position of the first station based at least in part on the first round trip time, the location of the first antenna of the second station, the second round trip time, and the location of the second antenna of the second station.

46. The apparatus of clause 37 wherein the at least one processor is further configured to receive antenna dimensions associated with the first antenna of the second station and the second antenna of the second station.

47. The apparatus of clause 46 wherein the assistance data is received via an ITS frequency spectrum of a V2X frequency spectrum.

48. The apparatus of clause 46 wherein the second station is a vehicle and the antenna dimensions are associated with a vehicle identification information.

49. The apparatus of clause 46 wherein the second station is a vehicle and the antenna dimensions are associated with a user identification information.

50. The apparatus of clause 37 wherein the at least one processor is further configured to:

determine a third round trip time for the positioning reference signals transmitted between the first station and a third antenna of the second station, wherein the first antenna, the second, and the third antenna are disposed in different locations proximate to the second station; and determine relative locations of the first station and the second station based at least in part on the first round trip time, the second round trip time, and the third round trip time.

51. An apparatus for determining a time of arrival difference with a distributed antenna system, comprising:

means for receiving a positioning reference signal on a first antenna disposed in a first location;

means for determining a first time of arrival based on the positioning reference signal received on the first antenna;

means for receiving the positioning reference signal on a second antenna disposed in a second location, wherein the first location and the second location are different;

means for determining a second time of arrival based on the positioning reference signal received on the second antenna; and means for transmitting time information based at least in part on the first time of arrival and the second time of arrival.

52. The apparatus of clause 51 wherein the first antenna is disposed on a forward portion of a vehicle and the second antenna is disposed in a rear portion of the vehicle.

53. The apparatus of clause 52 wherein the first antenna is disposed on a first side of a centerline of the vehicle, and the second antenna is disposed on a second side of the centerline of the vehicle.

54. The apparatus of clause 51 wherein the first antenna and the second antenna are operably coupled to a roadside unit.

55. The apparatus of clause 51 wherein the positioning reference signal is transmitted via an unlicensed spectrum.

56. The apparatus of clause 51 wherein the positioning reference signal is transmitted via a vehicle-to-everything (V2X) sidelink and an associated sidelink protocol.

57. The apparatus of clause 56 wherein the V2X sidelink communicates within an intelligent transportation systems (ITS) frequency spectrum including 5.9 GHz.

58. The apparatus of clause 51 wherein the time information is transmitted via sidelink within an intelligent transportation systems (ITS) frequency spectrum including 5.9 GHz.

59. The apparatus of clause 51 wherein the time information is a difference in time between the second time of arrival and the first time of arrival.

60. The apparatus of clause 51 wherein the time information is a first reference time based on the first time of arrival, and a second reference time based on the second time of arrival, wherein the first reference time and the second reference time are based on a network time.

61. The apparatus of clause 51 further comprising:

means for receiving the positioning reference signal on a third antenna disposed in a third location, wherein the third location is different from the first location and the second location;

means for determining a third time of arrival based on the positioning reference signal received on the third antenna;

means for transmitting the time information based at least in part on the third time of arrival.

62. An apparatus for determining relative locations of two stations, comprising:

means for determining a first round trip time for positioning reference signals transmitted between a first station and a first antenna of a second station;

means for determining a second round trip time for the positioning reference signals transmitted between the first station and a second antenna of the second station, wherein the first antenna and the second antenna are disposed in different locations proximate to the second station; and means for determining relative locations of the first station and the second station based at least in part on the first round trip time and the second round trip time.

63. The apparatus of clause 62 wherein the first station is a user equipment in a vehicle and the second station is a roadside unit with a distributed antenna system.

64. The apparatus of clause 62 wherein the first station is a roadside unit and the second station is a user equipment in a vehicle with a distributed antenna system.

65. The apparatus of clause 62 wherein the positioning reference signals are transmitted via an unlicensed spectrum.

66. The apparatus of clause 62 wherein the positioning reference signals are transmitted via a vehicle-to-everything (V2X) sidelink and an associated sidelink protocol.

67. The apparatus of clause 66 wherein the V2X sidelink communicates within an intelligent transportation systems (ITS) frequency spectrum including 5.9 GHz.

68. The apparatus of clause 62 further comprising determining an orientation of the second station relative to the first station.

69. The apparatus of clause 62 wherein a distance between the first antenna and the second antenna is in a range of three to nine feet.

70. The apparatus of clause 62 further comprising:

means for receiving assistance data from a network server comprising a location of the first antenna of the second station and a location of the second antenna of the second station; and means for determining an estimated position of the first station based at least in part on the first round trip time, the location of the first antenna of the second station, the second round trip time, and the location of the second antenna of the second station.

71. The apparatus of clause 62 further comprising means for receiving assistance data from a network server data comprising antenna dimensions associated with the first antenna of the second station and the second antenna of the second station.

72. The apparatus of clause 71 wherein the assistance data is received via an ITS frequency spectrum of a V2X frequency spectrum.

73. The apparatus of clause 71 wherein the second station is a vehicle and the antenna dimensions are associated with a vehicle identification information.

74. The apparatus of clause 71 wherein the second station is a vehicle and the antenna dimensions are associated with a user identification information.

75. The apparatus of clause 62 further comprising:

means for determining a third round trip time for the positioning reference signals transmitted between the first station and a third antenna of the second station, wherein the first antenna, the second, and the third antenna are disposed in different locations proximate to the second station; and means for determining relative locations of the first station and the second station based at least in part on the first round trip time, the second round trip time, and the third round trip time.

76. A non-transitory processor-readable storage medium comprising processor-readable instructions configured to cause one or more processors to determine a time of arrival difference with a distributed antenna system, comprising:

code for receiving a positioning reference signal on a first antenna disposed in a first location;

code for determining a first time of arrival based on the positioning reference signal received on the first antenna;

code for receiving the positioning reference signal on a second antenna disposed in a second location, wherein the first location and the second location are different;

code for determining a second time of arrival based on the positioning reference signal received on the second antenna; and code for transmitting time information based at least in part on the first time of arrival and the second time of arrival.

77. The non-transitory processor-readable storage medium of clause 76 wherein the first antenna is disposed on a forward portion of a vehicle and the second antenna is disposed in a rear portion of the vehicle.

78. The non-transitory processor-readable storage medium of clause 77 wherein the first antenna is disposed on a first side of a centerline of the vehicle, and the second antenna is disposed on a second side of the centerline of the vehicle.

79. The non-transitory processor-readable storage medium of clause 76 wherein the first antenna and the second antenna are operably coupled to a roadside unit.

80. The non-transitory processor-readable storage medium of clause 76 wherein the positioning reference signal is transmitted via an unlicensed spectrum.

81. The non-transitory processor-readable storage medium of clause 76 wherein the positioning reference signal is transmitted via a vehicle-to-everything (V2X) sidelink and an associated sidelink protocol.

82. The non-transitory processor-readable storage medium of clause 81 wherein the V2X sidelink communicates within an intelligent transportation systems (ITS) frequency spectrum including 5.9 GHz.

83. The non-transitory processor-readable storage medium of clause 76 wherein the time information is transmitted via sidelink within an intelligent transportation systems (ITS) frequency spectrum including 5.9 GHz.

84. The non-transitory processor-readable storage medium of clause 76 wherein the time information is a difference in time between the second time of arrival and the first time of arrival.

85. The non-transitory processor-readable storage medium of clause 76 wherein the time information is a first reference time based on the first time of arrival, and a second reference time based on the second time of arrival, wherein the first reference time and the second reference time are based on a network time.

86. The non-transitory processor-readable storage medium of clause 76 further comprising:

code for receiving the positioning reference signal on a third antenna disposed in a third location, wherein the third location is different from the first location and the second location;

code for determining a third time of arrival based on the positioning reference signal received on the third antenna;

code for transmitting the time information based at least in part on the third time of arrival.

87. A non-transitory processor-readable storage medium comprising processor-readable instructions configured to cause one or more processors to determine relative locations of two stations, comprising:

code for determining a first round trip time for positioning reference signals transmitted between a first station and a first antenna of a second station;

code for determining a second round trip time for the positioning reference signals transmitted between the first station and a second antenna of the second station, wherein the first antenna and the second antenna are disposed in different locations proximate to the second station; and code for determining relative locations of the first station and the second station based at least in part on the first round trip time and the second round trip time.

88. The non-transitory processor-readable storage medium of clause 87 wherein the first station is a user equipment in a vehicle and the second station is a roadside unit with a distributed antenna system.

89. The non-transitory processor-readable storage medium of clause 87 wherein the first station is a roadside unit and the second station is a user equipment in a vehicle with a distributed antenna system.

90. The non-transitory processor-readable storage medium of clause 87 wherein the positioning reference signals are transmitted via an unlicensed spectrum.

91. The non-transitory processor-readable storage medium of clause 87 wherein the positioning reference signals are transmitted via a vehicle-to-everything (V2X) sidelink and an associated sidelink protocol.

92. The non-transitory processor-readable storage medium of clause 91 wherein the V2X sidelink communicates within an intelligent transportation systems (ITS) frequency spectrum including 5.9 GHz.

93. The non-transitory processor-readable storage medium of clause 87 further comprising determining an orientation of the second station relative to the first station.

94. The non-transitory processor-readable storage medium of clause 87 wherein a distance between the first antenna and the second antenna is in a range of three to nine feet.

95. The non-transitory processor-readable storage medium of clause 87 further comprising:

code for receiving assistance data from a network server comprising a location of the first antenna of the second station and a location of the second antenna of the second station; and code for determining an estimated position of the first station based at least in part on the first round trip time, the location of the first antenna of the second station, the second round trip time, and the location of the second antenna of the second station.

96. The non-transitory processor-readable storage medium of clause 87 further comprising code for receiving assistance data from a network server data comprising antenna dimensions associated with the first antenna of the second station and the second antenna of the second station.

97. The non-transitory processor-readable storage medium of clause 96 wherein the assistance data is received via an ITS frequency spectrum of a V2X frequency spectrum.

98. The non-transitory processor-readable storage medium of clause 96 wherein the second station is a vehicle and the antenna dimensions are associated with a vehicle identification information.

99. The non-transitory processor-readable storage medium of clause 96 wherein the second station is a vehicle and the antenna dimensions are associated with a user identification information.

100. The non-transitory processor-readable storage medium of clause 87 further comprising:
code for determining a third round trip time for the positioning reference signals transmitted between the first station and a third antenna of the second station, wherein the first antenna, the second, and the third antenna are disposed in different locations proximate to the second station; and
code for determining relative locations of the first station and the second station based at least in part on the first round trip time, the second round trip time, and the third round trip time.

The invention claimed is:

1. A method for determining a time of arrival difference with a distributed antenna system, comprising:
receiving a positioning reference signal on a first antenna disposed in a first location;
determining a first time of arrival based on the positioning reference signal received on the first antenna;
receiving the positioning reference signal on a second antenna disposed in a second location, wherein the first location and the second location are different;
determining a second time of arrival based on the positioning reference signal received on the second antenna; and
transmitting time information based at least in part on the first time of arrival and the second time of arrival, and antenna dimension information based at least in part on the first location and the second location.

2. The method of claim 1 wherein the first antenna is disposed on a forward portion of a vehicle and the second antenna is disposed in a rear portion of the vehicle.

3. The method of claim 2 wherein the first antenna is disposed on a first side of a centerline of the vehicle, and the second antenna is disposed on a second side of the centerline of the vehicle.

4. The method of claim 1 wherein the first antenna and the second antenna are operably coupled to a roadside unit.

5. The method of claim 1 wherein the positioning reference signal is transmitted via an unlicensed spectrum.

6. The method of claim 1 wherein the positioning reference signal is transmitted via a vehicle-to-everything (V2X) sidelink and an associated sidelink protocol.

7. The method of claim 6 wherein the V2X sidelink is within an intelligent transportation systems (ITS) frequency spectrum including 5.9 GHz.

8. The method of claim 1 wherein the time information is transmitted via sidelink within an intelligent transportation systems (ITS) frequency spectrum including 5.9 GHz.

9. The method of claim 1 wherein the time information is a difference in time between the second time of arrival and the first time of arrival.

10. The method of claim 1 wherein the time information is a first reference time based on the first time of arrival, and a second reference time based on the second time of arrival, wherein the first reference time and the second reference time are based on a network time.

11. The method of claim 1 further comprising:
receiving the positioning reference signal on a third antenna disposed in a third location, wherein the third location is different from the first location and the second location;
determining a third time of arrival based on the positioning reference signal received on the third antenna;
transmitting the time information based at least in part on the third time of arrival.

12. A method for determining relative locations of two stations, comprising:
determining a first round trip time for positioning reference signals transmitted between a first station and a first antenna of a second station;
determining a second round trip time for the positioning reference signals transmitted between the first station and a second antenna of the second station, wherein the first antenna and the second antenna are disposed in different locations proximate to the second station;
determining relative locations of the first station and the second station based at least in part on the first round trip time and the second round trip time;
receiving assistance data from a network server, the assistance data comprising a location of the first antenna of the second station and a location of the second antenna of the second station; and
determining an estimated position of the first station based at least in part on the first round trip time, the location of the first antenna of the second station, the second round trip time, and the location of the second antenna of the second station.

13. The method of claim 12 wherein the first station is a user equipment in a vehicle and the second station is a roadside unit with a distributed antenna system.

14. The method of claim 12 wherein the positioning reference signals are transmitted via an unlicensed spectrum.

15. The method of claim 12 wherein the positioning reference signals are transmitted via a vehicle-to-everything (V2X) sidelink and an associated sidelink protocol.

16. The method of claim 15 wherein the V2X sidelink is within an intelligent transportation systems (ITS) frequency spectrum including 5.9 GHz.

17. The method of claim 12 further comprising determining an orientation of the second station relative to the first station.

18. The method of claim 12 wherein a distance between the first antenna and the second antenna is in a range of three to nine feet.

19. The method of claim 12 wherein the assistance data comprises antenna dimensions associated with the first antenna of the second station and the second antenna of the second station.

20. The method of claim 19 wherein the assistance data is received via an ITS frequency spectrum of a V2X frequency spectrum.

21. The method of claim 12 further comprising:
determining a third round trip time for the positioning reference signals transmitted between the first station and a third antenna of the second station, wherein the first antenna, the second, and the third antenna are disposed in different locations proximate to the second station; and
determining relative locations of the first station and the second station based at least in part on the first round trip time, the second round trip time, and the third round trip time.

22. An apparatus for determining a time of arrival difference with a distributed antenna system, comprising:
a memory;
at least one transceiver;
at least one processor communicatively coupled to the memory and the at least one transceiver and configured to:

receive a positioning reference signal on a first antenna disposed in a first location, the first antenna being communicatively coupled to the at least one transceiver;

determine a first time of arrival based on the positioning reference signal received on the first antenna;

receive the positioning reference signal on a second antenna disposed in a second location, the second antenna being communicatively coupled to the at least one transceiver, and wherein the first location and the second location are different;

determine a second time of arrival based on the positioning reference signal received on the second antenna; and transmit time information based at least in part on the first time of arrival and the second time of arrival and antenna dimension information based at least in part on the first location and the second location.

23. The apparatus of claim 22 wherein the first antenna is disposed on a forward portion of a vehicle and the second antenna is disposed in a rear portion of the vehicle.

24. The apparatus of claim 22 wherein the at least one processor is further configured to:

receive the positioning reference signal on a third antenna disposed in a third location, the third antenna being communicatively coupled to the at least one transceiver, and wherein the third location is different from the first location and the second location;

determine a third time of arrival based on the positioning reference signal received on the third antenna;

transmit the time information based at least in part on the third time of arrival.

25. An apparatus for determining relative locations of two stations, comprising:

a memory;

at least one transceiver;

at least one processor communicatively coupled to the memory and the at least one transceiver, and configured to:

determine a first round trip time for positioning reference signals transmitted between a first station and a first antenna of a second station;

determine a second round trip time for the positioning reference signals transmitted between the first station and a second antenna of the second station, wherein the first antenna and the second antenna are disposed in different locations proximate to the second station;

determine relative locations of the first station and the second station based at least in part on the first round trip time and the second round trip time;

receive assistance data from a network server comprising a location of the first antenna of the second station and a location of the second antenna of the second station; and determine an estimated position of the first station based at least in part on the first round trip time, the location of the first antenna of the second station, the second round trip time, and the location of the second antenna of the second station.

* * * * *